United States Patent
Serrano et al.

(10) Patent No.: US 10,493,836 B2
(45) Date of Patent: Dec. 3, 2019

(54) NOISE/VIBRATION CONTROL USING VARIABLE SPRING ABSORBER

(71) Applicant: Tula Technology, Inc., San Jose, CA (US)

(72) Inventors: Louis J. Serrano, Los Gatos, CA (US); Matthew A. Younkins, San Jose, CA (US); Vijay Srinivasan, Farmington Hills, MI (US)

(73) Assignee: Tula Technology, Inc., San Jose, CA (US)

( * ) Notice: Subject to any disclaimer, the term of this patent is extended or adjusted under 35 U.S.C. 154(b) by 116 days.

(21) Appl. No.: 15/894,521

(22) Filed: Feb. 12, 2018

(65) Prior Publication Data
US 2019/0248221 A1    Aug. 15, 2019

(51) Int. Cl.
*B60K 5/12*    (2006.01)
*F16F 15/04*   (2006.01)
(Continued)

(52) U.S. Cl.
CPC .......... *B60K 5/1283* (2013.01); *B60W 10/06* (2013.01); *B60W 10/30* (2013.01); *B60W 30/20* (2013.01); *F02D 17/02* (2013.01); *F02D 41/0087* (2013.01); *F16F 15/04* (2013.01); *F16F 15/121* (2013.01); *B60W 2030/206* (2013.01); *B60W 2510/06* (2013.01); *B60W 2510/0638* (2013.01);
(Continued)

(58) Field of Classification Search
CPC ...... B60K 5/1283; F16F 15/04; F16F 15/121; F16F 2228/066; F02D 17/02; F02D 41/0087; B60W 30/20; B60W 10/30; B60W 10/03; B60W 2720/00; B60W 2710/06; B60W 2530/206; B60W 2510/0638; B60W 2510/06; B60Y 2400/48; B60Y 2300/205
See application file for complete search history.

(56) References Cited

U.S. PATENT DOCUMENTS 4,434,767 A    3/1984    Kohama et al.
4,489,695 A   12/1984    Kohama et al.
(Continued)

FOREIGN PATENT DOCUMENTS

EP    0980965    2/2000
EP    2669495   12/2013
(Continued)

OTHER PUBLICATIONS

U.S. Office Action dated Jul. 13, 2016 from U.S. Appl. No. 14/509,792.
(Continued)

*Primary Examiner* — Grant Moubry
*Assistant Examiner* — James G. Moubry
(74) *Attorney, Agent, or Firm* — Beyer Law Group LLP

(57) ABSTRACT

Systems and methods are described for mitigating vehicle vibration through the control of a variable spring absorber that is part of a powertrain that includes the engine. In some such embodiments, an absorption frequency of the variable spring absorber is tuned in a feed forward manner based at least in part on the current engine speed and a factor indicative of the minimum repeating firing sequence cycle length associated with the current effective firing fraction (which in many implementations may be the denominator of the firing fraction).

16 Claims, 16 Drawing Sheets

(51) Int. Cl.
*F02D 17/02* (2006.01)
*F16F 15/121* (2006.01)
*B60W 10/06* (2006.01)
*B60W 10/30* (2006.01)
*B60W 30/20* (2006.01)
*F02D 41/00* (2006.01)

(52) U.S. Cl.
CPC ..... *B60W 2710/06* (2013.01); *B60W 2720/00* (2013.01); *B60Y 2300/205* (2013.01); *B60Y 2400/48* (2013.01); *F16F 2228/066* (2013.01)

(56) References Cited

U.S. PATENT DOCUMENTS

| | | | |
|---|---|---|---|
| 4,509,488 A | 4/1985 | Forster et al. |
| 4,556,026 A | 12/1985 | Masuda et al. |
| 4,592,315 A | 6/1986 | Kobayashi et al. |
| 5,117,790 A | 6/1992 | Clarke et al. |
| 5,129,407 A | 7/1992 | Phillips et al. |
| 5,374,224 A | 12/1994 | Huffmaster et al. |
| 5,377,631 A | 1/1995 | Schechter |
| 5,485,523 A | 1/1996 | Tamamura et al. |
| 5,488,667 A | 1/1996 | Tamamura et al. |
| 5,493,616 A | 2/1996 | Iidaka et al. |
| 5,540,633 A | 7/1996 | Yamanaka et al. |
| 5,597,371 A | 1/1997 | Toukura |
| 5,743,221 A | 4/1998 | Schmitz |
| 5,758,311 A | 5/1998 | Tsuji et al. |
| 5,809,152 A | 9/1998 | Nakamura et al. |
| 5,836,274 A | 11/1998 | Saito et al. |
| 5,912,821 A | 6/1999 | Kobayashi |
| 5,934,424 A | 8/1999 | Hosek et al. |
| 5,975,052 A | 11/1999 | Moyer |
| 6,018,689 A | 1/2000 | Kumura et al. |
| 6,158,411 A | 12/2000 | Morikawa |
| 6,273,208 B1 | 8/2001 | Sand |
| 6,343,581 B2 | 2/2002 | Suzuki |
| 6,382,193 B1 | 5/2002 | Boyer et al. |
| 6,405,701 B1 | 6/2002 | Masberg et al. |
| 6,443,125 B1 | 9/2002 | Mendler |
| 6,450,065 B1 | 9/2002 | Eckel et al. |
| 6,484,677 B2 | 11/2002 | Leone et al. |
| 6,487,998 B1 | 12/2002 | Masberg et al. |
| 6,571,771 B2 | 6/2003 | Doering et al. |
| 6,600,989 B2 | 7/2003 | Sellnau et al. |
| 6,619,258 B2 | 9/2003 | McKay et al. |
| 6,688,272 B2 | 2/2004 | Brevick et al. |
| 6,805,095 B2 | 10/2004 | Sun et al. |
| 6,823,835 B2 | 11/2004 | Dunsworth et al. |
| 6,843,752 B2 | 1/2005 | Bolander |
| 6,866,020 B2 | 3/2005 | Allston et al. |
| 6,959,241 B2 | 10/2005 | Itow et al. |
| 7,032,545 B2 | 4/2006 | Lewis et al. |
| 7,032,581 B2 | 4/2006 | Gibson et al. |
| 7,058,501 B2 | 6/2006 | Yasui et al. |
| 7,059,997 B2 | 6/2006 | Nishizawa et al. |
| 7,063,062 B2 | 6/2006 | Lewis et al. |
| 7,066,136 B2 | 6/2006 | Ogiso |
| 7,086,386 B2 | 8/2006 | Doering |
| 7,090,048 B2 | 8/2006 | Albertson et al. |
| 7,128,044 B1 | 10/2006 | Doering et al. |
| 7,140,355 B2 | 11/2006 | Michelini et al. |
| 7,146,966 B2 | 12/2006 | Nakamura |
| 7,155,333 B1 | 12/2006 | Abram et al. |
| 7,179,199 B2 | 2/2007 | Kushiyama et al. |
| 7,231,907 B2 | 6/2007 | Bolander et al. |
| 7,232,401 B2 | 6/2007 | Albertson |
| 7,249,583 B2 | 7/2007 | Bidner et al. |
| 7,249,584 B2 | 7/2007 | Rozario et al. |
| 7,260,467 B2 | 8/2007 | Megli et al. |
| 7,288,046 B2 | 10/2007 | Boone et al. |
| 7,377,260 B2 | 5/2008 | Jehle et al. |
| 7,426,915 B2 | 9/2008 | Gibson et al. |
| 7,428,947 B2 | 9/2008 | Nohl et al. |
| 7,503,312 B2 | 3/2009 | Surnilla et al. |
| 7,523,734 B2 | 4/2009 | Albertson et al. |
| 7,532,972 B2 | 5/2009 | Kolmanovsky et al. |
| 7,577,511 B1 | 8/2009 | Tripathi et al. |
| 7,603,972 B2 | 10/2009 | Han et al. |
| 7,717,408 B2 | 5/2010 | Nemoto |
| 7,751,963 B2 | 7/2010 | Gecim et al. |
| 7,757,657 B2 | 7/2010 | Albertson et al. |
| 7,765,806 B2 | 8/2010 | Clark |
| 7,785,230 B2 | 8/2010 | Gibson et al. |
| 7,801,691 B2 | 9/2010 | Panciroli et al. |
| 7,814,878 B2 | 10/2010 | Petridis et al. |
| 7,849,835 B2 | 12/2010 | Tripathi et al. |
| 7,886,715 B2 | 2/2011 | Tripathi et al. |
| 7,899,607 B2 | 3/2011 | Shin et al. |
| 7,908,913 B2 | 3/2011 | Cinpinski et al. |
| 7,930,087 B2 | 4/2011 | Gibson et al. |
| 7,941,994 B2 | 5/2011 | Surnilla et al. |
| 7,950,359 B2 | 5/2011 | Choi |
| 7,954,474 B2 | 6/2011 | Tripathi et al. |
| 7,974,769 B2 | 7/2011 | Shin |
| 8,027,484 B2 | 9/2011 | Yoshida et al. |
| 8,028,665 B2 | 10/2011 | Ralston |
| 8,052,575 B2 | 11/2011 | Albertson et al. |
| 8,061,318 B2 | 11/2011 | Cleary et al. |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,145,410 B2 | 3/2012 | Berger et al. |
| 8,215,099 B2 | 7/2012 | Ono et al. |
| 8,280,576 B2 | 10/2012 | Baeuerle et al. |
| 8,286,471 B2 | 10/2012 | Doering |
| 8,312,849 B2 | 11/2012 | Roe et al. |
| 8,347,857 B2 | 1/2013 | Cleary et al. |
| 8,402,942 B2 | 3/2013 | Tripathi et al. |
| 8,473,179 B2 | 6/2013 | Whitney et al. |
| 8,489,303 B2 | 7/2013 | Phillips |
| 8,499,743 B2 | 8/2013 | Tripathi et al. |
| 8,561,499 B1 | 10/2013 | Schiemann et al. |
| 8,631,646 B2 | 1/2014 | Smith et al. |
| 8,789,502 B2 | 7/2014 | Barnes |
| 8,892,330 B2 | 11/2014 | Yuille et al. |
| 8,931,444 B2 | 1/2015 | McConville et al. |
| 9,020,735 B2* | 4/2015 | Tripathi ............ F02D 41/1401 701/102 |
| 9,086,020 B2 | 7/2015 | Pirjaberi et al. |
| 9,200,575 B2* | 12/2015 | Shost .................. F02D 17/02 |
| 9,267,454 B2 | 2/2016 | Wilcutts et al. |
| 9,399,964 B2 | 7/2016 | Younkins et al. |
| 9,476,373 B2 | 10/2016 | Younkins et al. |
| 9,605,601 B2 | 3/2017 | Leone et al. |
| 9,689,327 B2 | 6/2017 | Younkins et al. |
| 9,689,328 B2 | 6/2017 | Younkins et al. |
| 2001/0023686 A1 | 9/2001 | Okamoto |
| 2001/0035141 A1 | 11/2001 | Pierik |
| 2002/0096134 A1 | 7/2002 | Michelini et al. |
| 2003/0062019 A1 | 4/2003 | Schaefer-Siebert |
| 2003/0145584 A1 | 8/2003 | Ciray |
| 2003/0145585 A1 | 8/2003 | Uhler et al. |
| 2003/0221653 A1 | 12/2003 | Brevick et al. |
| 2003/0230280 A1 | 12/2003 | Allston |
| 2004/0118632 A1 | 6/2004 | Ciray |
| 2004/0237949 A1 | 12/2004 | Yasui |
| 2004/0258251 A1 | 12/2004 | Inoue et al. |
| 2005/0000480 A1 | 1/2005 | Yasui et al. |
| 2005/0003928 A1 | 1/2005 | Niki et al. |
| 2005/0038576 A1 | 2/2005 | Hara et al. |
| 2005/0045156 A1 | 3/2005 | Yokoi |
| 2005/0049108 A1 | 3/2005 | Nishizawa et al. |
| 2005/0067219 A1 | 3/2005 | Albertson et al. |
| 2005/0150561 A1 | 7/2005 | Flynn et al. |
| 2005/0161023 A1 | 7/2005 | Albertson |
| 2005/0193720 A1 | 9/2005 | Surnilla et al. |
| 2005/0199220 A1 | 9/2005 | Ogiso |
| 2005/0216132 A1 | 9/2005 | Masters et al. |
| 2005/0268880 A1 | 12/2005 | Bidner et al. |
| 2005/0284438 A1 | 12/2005 | Hasebe |
| 2006/0020386 A1 | 1/2006 | Kang |
| 2006/0037578 A1 | 2/2006 | Nakamura |
| 2006/0101903 A1 | 5/2006 | Moninger |

(56) References Cited

U.S. PATENT DOCUMENTS

| | | |
|---|---|---|
| 2006/0178802 A1 | 8/2006 | Bolander et al. |
| 2006/0180119 A1 | 8/2006 | Winstead |
| 2006/0269078 A1 | 11/2006 | Sakamoto et al. |
| 2007/0012283 A1 | 1/2007 | Rockwell |
| 2007/0013116 A1 | 1/2007 | Nemoto et al. |
| 2007/0029712 A1 | 2/2007 | Nemoto |
| 2007/0029713 A1 | 2/2007 | Shin et al. |
| 2007/0131196 A1 | 6/2007 | Gibson et al. |
| 2007/0138338 A1 | 6/2007 | Luo et al. |
| 2007/0234985 A1 | 10/2007 | Kolmanovsky |
| 2007/0235005 A1 | 10/2007 | Lewis |
| 2007/0243971 A1 | 10/2007 | Brevick |
| 2008/0083395 A1 | 4/2008 | Shin et al. |
| 2008/0115748 A1 | 5/2008 | Willats et al. |
| 2008/0133177 A1 | 6/2008 | Klenk et al. |
| 2008/0154468 A1 | 6/2008 | Berger et al. |
| 2008/0156293 A1 | 7/2008 | Huang |
| 2008/0240456 A1 | 10/2008 | Sakamoto et al. |
| 2008/0262712 A1 | 10/2008 | Duty et al. |
| 2008/0288146 A1 | 11/2008 | Beechie et al. |
| 2009/0037048 A1 | 2/2009 | Shin |
| 2009/0039577 A1 | 2/2009 | Ishiguro et al. |
| 2009/0048764 A1 | 2/2009 | Fuwa |
| 2009/0133949 A1 | 5/2009 | Shin et al. |
| 2009/0158831 A1 | 6/2009 | Cornwell et al. |
| 2009/0177371 A1 | 7/2009 | Reinke |
| 2009/0204312 A1 | 8/2009 | Moriya |
| 2009/0210139 A1 | 8/2009 | Gecim et al. |
| 2009/0236173 A1 | 9/2009 | McCain et al. |
| 2009/0239707 A1 | 9/2009 | Albertson |
| 2009/0241918 A1 | 10/2009 | Shinagawa |
| 2009/0248277 A1 | 10/2009 | Shinagawa et al. |
| 2009/0248278 A1 | 10/2009 | Nakasaka |
| 2009/0277407 A1 | 11/2009 | Ezaki |
| 2009/0292439 A1 | 11/2009 | Luken et al. |
| 2009/0319160 A1 | 12/2009 | Callahan et al. |
| 2010/0012072 A1 | 1/2010 | Leone et al. |
| 2010/0050993 A1 | 3/2010 | Zhao et al. |
| 2010/0089362 A1 | 4/2010 | Haskara et al. |
| 2010/0100299 A1 | 4/2010 | Tripathi et al. |
| 2010/0204881 A1 | 8/2010 | Muragishi et al. |
| 2010/0305837 A1 | 12/2010 | Gagliano |
| 2011/0000459 A1 | 1/2011 | Elsäβer |
| 2011/0029222 A1 | 2/2011 | Luken et al. |
| 2011/0030657 A1 | 2/2011 | Tripathi et al. |
| 2011/0073069 A1 | 3/2011 | Marriott et al. |
| 2011/0112734 A1 | 5/2011 | Whitney et al. |
| 2011/0139099 A1 | 6/2011 | Roe |
| 2011/0146637 A1 | 6/2011 | Kang |
| 2011/0179782 A1 | 7/2011 | Huegel et al. |
| 2011/0206213 A1 | 8/2011 | Sakamoto et al. |
| 2011/0213541 A1 | 9/2011 | Tripathi et al. |
| 2011/0214640 A1 | 9/2011 | Chang et al. |
| 2011/0288734 A1 | 11/2011 | Phillips et al. |
| 2012/0031357 A1 | 2/2012 | Ervin et al. |
| 2012/0078465 A1 | 3/2012 | Reilly et al. |
| 2012/0221217 A1 | 8/2012 | Sujan et al. |
| 2013/0008412 A1 | 1/2013 | Kidooka |
| 2013/0037005 A1 | 2/2013 | Graf et al. |
| 2013/0066502 A1 | 3/2013 | Yuille |
| 2013/0092127 A1 | 4/2013 | Pirjaberi |
| 2013/0092128 A1 | 4/2013 | Pirjaberi et al. |
| 2013/0118443 A1 | 5/2013 | Tripathi et al. |
| 2013/0276730 A1 | 10/2013 | Borean |
| 2014/0041624 A1 | 2/2014 | Rayl et al. |
| 2014/0041625 A1 | 2/2014 | Pirjaberi et al. |
| 2014/0045652 A1 | 2/2014 | Carlson et al. |
| 2014/0109847 A1 | 4/2014 | Hayman et al. |
| 2014/0158067 A1 | 6/2014 | Woo et al. |
| 2014/0249733 A1 | 9/2014 | Ishiguro et al. |
| 2014/0277999 A1 | 9/2014 | Switkes et al. |
| 2014/0360477 A1 | 12/2014 | Doering et al. |
| 2015/0046031 A1 | 2/2015 | Gagliano et al. |
| 2015/0100221 A1 | 4/2015 | Routledge et al. |
| 2015/0233308 A1 | 8/2015 | Kidooka et al. |
| 2015/0308301 A1 | 10/2015 | Mcconville |
| 2015/0322869 A1 | 11/2015 | Shost |
| 2016/0003168 A1 | 1/2016 | Leone |
| 2016/0003169 A1 | 1/2016 | Leone et al. |
| 2016/0010568 A1 | 1/2016 | Whiston et al. |
| 2016/0040614 A1 | 2/2016 | Younkins et al. |
| 2016/0108798 A1 | 4/2016 | VanDerWege |
| 2016/0108828 A1 | 4/2016 | Glugla |
| 2016/0115878 A1 | 4/2016 | VanDerWege |
| 2016/0115884 A1 | 4/2016 | VanDerWege |
| 2016/0146120 A1 | 5/2016 | Kawaguchi |
| 2016/0159364 A1 | 6/2016 | Wilcutts et al. |
| 2016/0160701 A1 | 6/2016 | Choi et al. |
| 2016/0201586 A1 | 7/2016 | Serrano et al. |
| 2016/0222899 A1 | 8/2016 | Glugla |
| 2016/0377007 A9 | 12/2016 | Wilcutts et al. |
| 2017/0009729 A1 | 1/2017 | Younkins et al. |
| 2017/0218866 A1 | 8/2017 | Shost et al. |
| 2017/0248189 A1 | 8/2017 | Buchanan et al. |
| 2017/0342920 A1 | 11/2017 | Pirjaberi et al. |
| 2018/0163650 A1 | 6/2018 | Serrano et al. |
| 2018/0230919 A1 | 8/2018 | Nagashima et al. |

FOREIGN PATENT DOCUMENTS

| | | |
|---|---|---|
| JP | 2006242013 | 9/2006 |
| JP | 2009257169 | 11/2009 |
| WO | WO 2010/006311 | 1/2010 |
| WO | WO 2011/085383 | 7/2011 |
| WO | WO 2012/112817 | 8/2012 |
| WO | WO 2016/036936 | 3/2016 |
| WO | WO 2016/048666 | 3/2016 |

OTHER PUBLICATIONS

U.S. Final Office Action dated Nov. 4, 2016 from U.S. Appl. No. 14/509,792.
U.S. Office Action dated Jul. 31, 2017 from U.S. Appl. No. 14/509,792.
U.S. Office Action dated Dec. 13, 2017 from U.S. Appl. No. 14/509,792.
Ortiz-Soto et al., U.S. Appl. No. 16/021,532, filed Jun. 28, 2018.
Written Opinion dated Feb. 5, 2014 from International Application No. PCT/US2013/054417.
International Preliminary Report on Patentability dated Sep. 29, 2015 from International Application No. PCT/US14/59736.
International Search Report dated Jan. 8, 2015 from International Application No. PCT/US2014/059736.
Written Opinion dated Jan. 8, 2015 from International Application No. PCT/US2014/059736.
International Search Report dated Feb. 19, 2016 from International Application No. PCT/US2015/059776.
Written Opinion dated Feb. 19, 2016 from International Application No. PCT/US2015/059776.
International Search Report dated Sep. 3, 2015 from International Application No. PCT/US 15/29543.
Written Opinion dated Sep. 3, 2015 from International Application No. PCT/US 15/29543.
Internal combustion engine has intermediate arm that is forced to move specific cam with respect to specific roller by causing preset rocker arm to rotate about control shaft and to change movement of valve. BARNES D M. 2016.
BorgWarner press release, "BorgWarner Presents Highly Adaptable P2 Hybrid Modules and Innovative Variable Spring Absorber at CTI Symposium in Berlin", https://www.borgwarner.com/news-media/press-releases/2017/12/04/borgwarner-presents-highly-adaptable-p2-hybrid-modules-and-innovative-variable-spring-absorber-at-cti-symposium-in-berlin, Dec. 4, 2017.
U.S. Office Action dated Sep. 20, 2018 from U.S. Appl. No. 14/509,792.
U.S. Office Action dated Jun. 14, 2019 from U.S. Appl. No. 15/894,548.

(56) References Cited

OTHER PUBLICATIONS

Notice of Allowance dated Jul. 12, 2019 from U.S. Appl. No. 15/894,548.
Routledge et al. U.S. Appl. No. 14/509,792, filed Oct. 8, 2014.
Serrano et al., U.S. Appl. No. 15/894,548, filed Feb. 12, 2018.
Serrano et al., U.S. Appl. No. 16/165,757, filed Oct. 19, 2018.

* cited by examiner

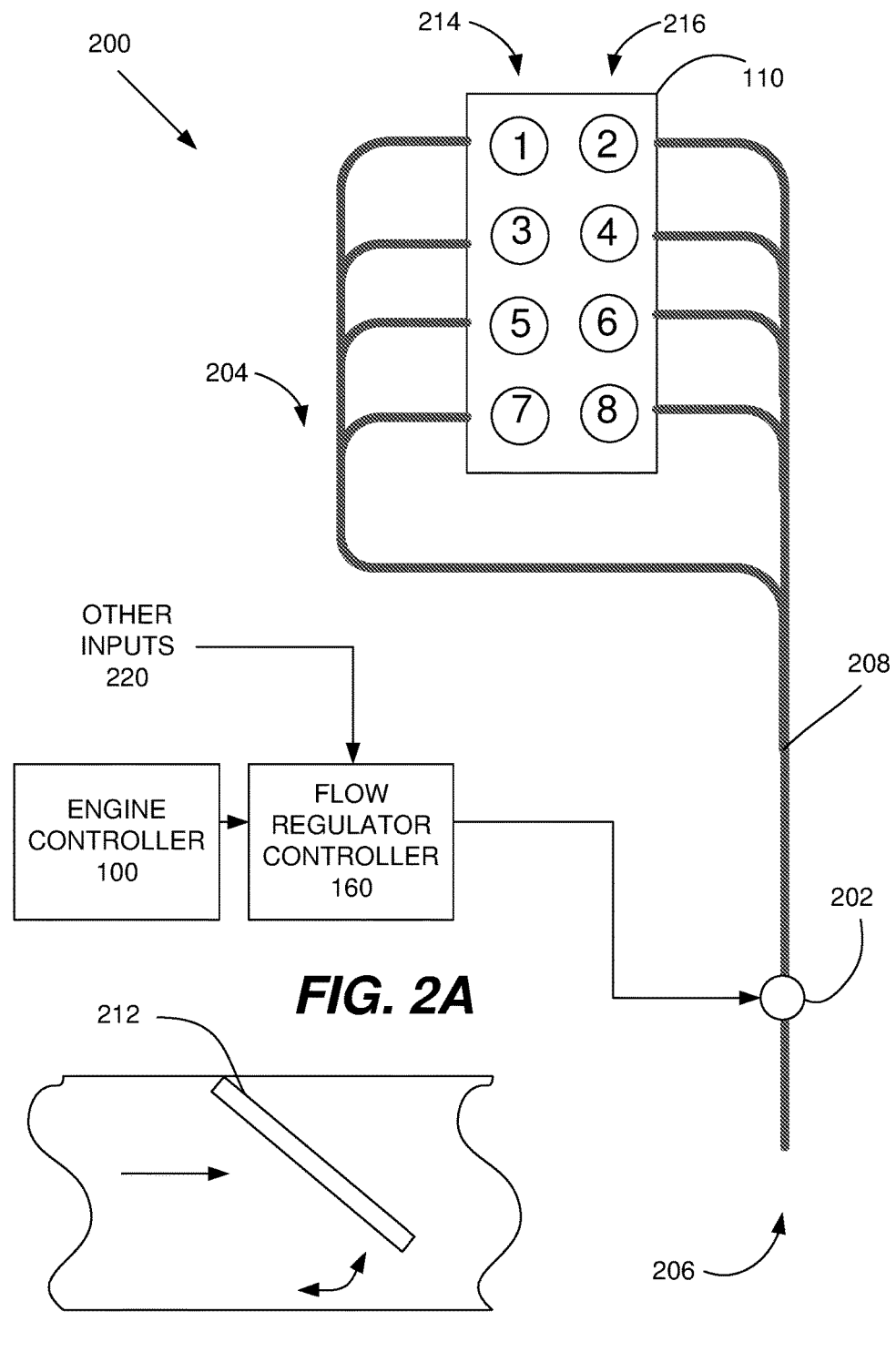

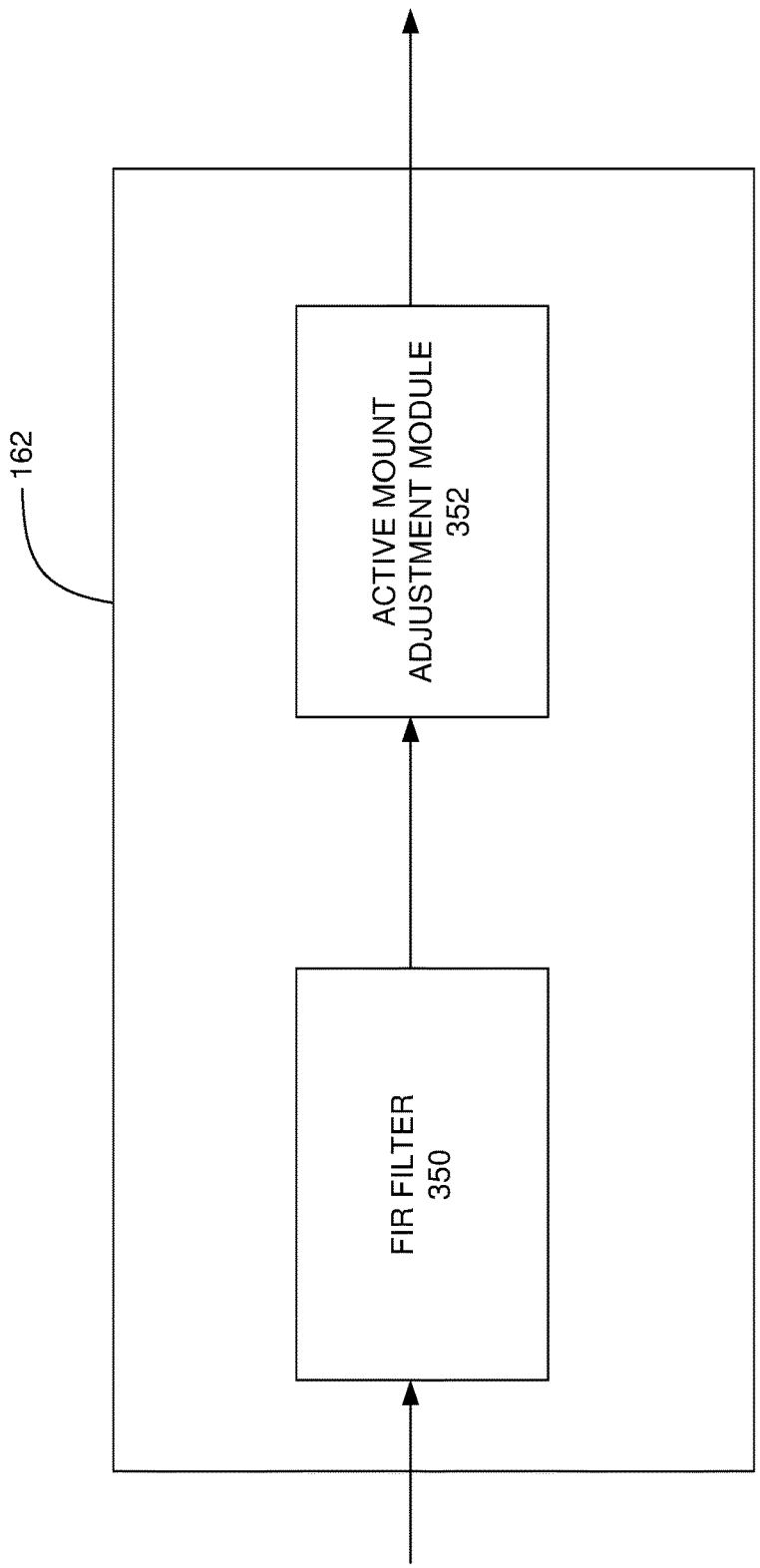

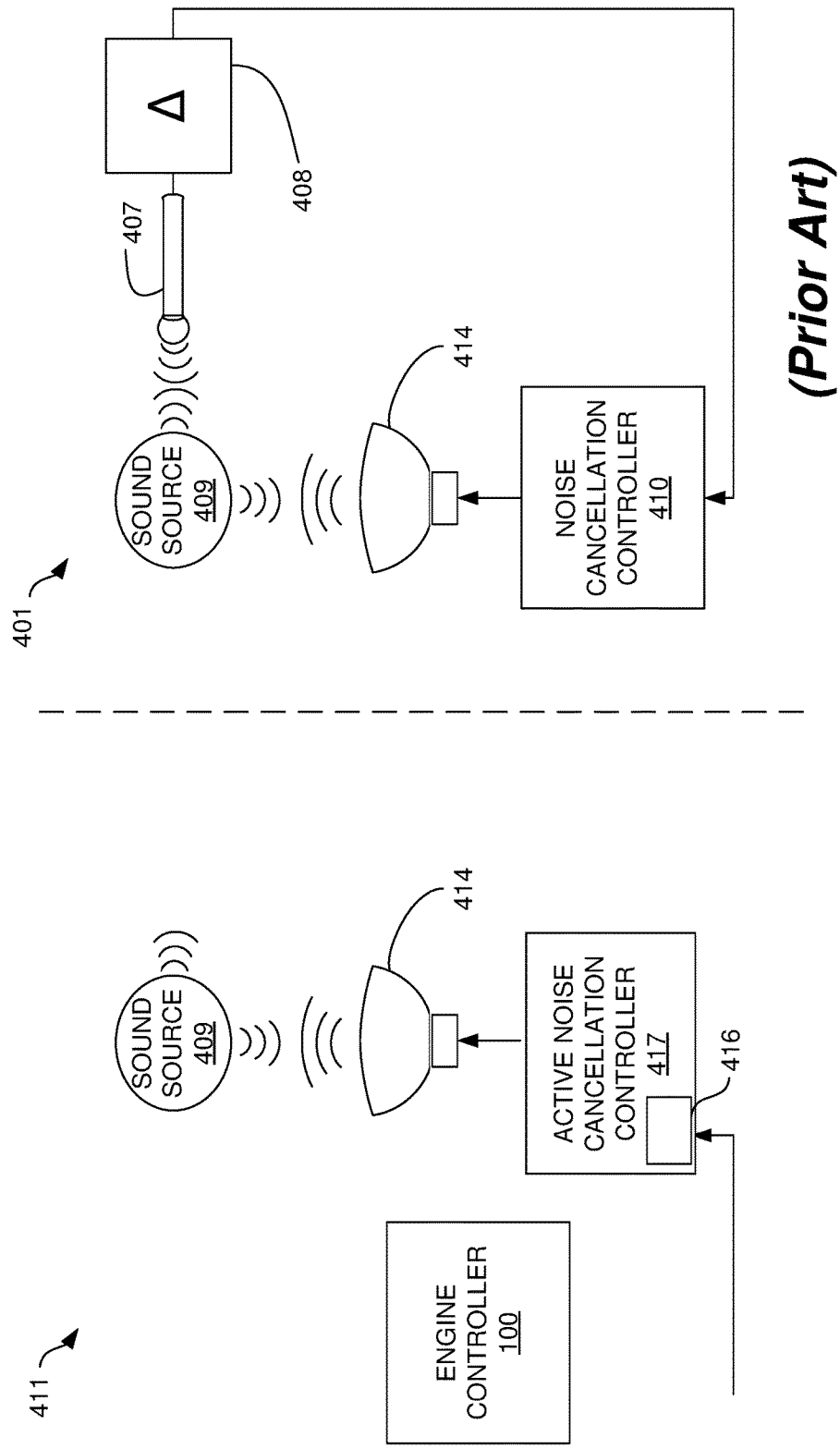

| FF | LF | FF$_{num}$ | FF$_{den}$ | LF$_{num}$ | LF$_{den}$ | gcf(FF$_{num}$, LF$_{den}$) | MRCL calculation | MRCL |
|---|---|---|---|---|---|---|---|---|
| 1/2 | 2/3 | 1 | 2 | 2 | 3 | gcf(1,3)=1 | 2*3/1 | 6 |
| 2/3 | 1/2 | 2 | 3 | 1 | 2 | gcf(2,2)=2 | 3*2/2 | 3 |
| 4/5 | 3/4 | 4 | 5 | 3 | 4 | gcf(4,4)=4 | 5*4/4 | 5 |
| 3/4 | 4/5 | 3 | 4 | 4 | 5 | gcf(3,5)=1 | 4*5/1 | 20 |
| 3/7 | 2/5 | 3 | 7 | 2 | 5 | gcf(3,5)=1 | 7*5/1 | 35 |
| 2/5 | 3/7 | 2 | 5 | 3 | 7 | gcf(2,7)=1 | 5*7/1 | 35 |

*FIG. 9*

NOISE/VIBRATION CONTROL USING VARIABLE SPRING ABSORBER

FIELD OF THE INVENTION

The present invention relates generally to methods and mechanisms for reducing noise and vibration generated by internal combustion engines. Various embodiments involve noise, vibration and/or harshness (NVH) reduction in cylinder output level modulation engine control.

BACKGROUND

Most vehicles in operation today are powered by internal combustion (IC) engines. Internal combustion engines typically have multiple cylinders or other working chambers where combustion occurs. The power generated by the engine depends on the amount of fuel and air that is delivered to each working chamber.

The combustion process and the firing of cylinders can introduce unwanted noise, vibration and harshness (NVH). For example, the engine can transfer vibration to the body of the vehicle, where it may be perceived by vehicle occupants. Sounds may also be transmitted through the chassis into the cabin of the vehicle. Under certain operating conditions, the firing of cylinders generates undesirable acoustic effects through the exhaust system and tailpipe. Vehicle occupants may thus experience undesirable NVH from structurally transmitted vibrations or sounds transmitted through the air.

There are a wide variety of ways to improve the acoustic and vibration characteristics of a vehicle. Typically, vehicles utilize engine mounts that both support the engine and absorb vibration from the engine. In some vehicles, the engine mount is active e.g., it can be stiffened or made more compliant depending on the engine speed and other conditions. For example, when the engine is at idle or under low load conditions, the active mount may become more compliant so that the vibration is better absorbed. At higher speeds, however, the mount may be stiffened to prevent excessive engine motion from damaging the connections between the engine and its attached components.

Some vehicles use a passive exhaust valve to help reduce engine noise. For example, the exhaust valve may involve a flap that is situated near the tailpipe along a line that connects the exhaust ports of the cylinders to the tailpipe. The flapper valve impedes the exhaust flow from the cylinders to the tailpipe. If the exhaust flow rate is low, the flap may tend to close, while high exhaust flow rates force the flap to open more widely. The flapper valve helps to dampen, reflect, or modulate pressure waves in the exhaust path that are generated by the engine, thereby reducing undesirable acoustic effects.

To help improve passenger comfort and reduce undesirable sounds in the cabin of a vehicle, an active noise cancellation system may be used. In some vehicles, for example, there are one or more speakers and microphones situated within the cabin. When noises from the road, engine or other parts of the vehicle enter the cabin, the microphones detect the noise. The noise is analyzed and used to generate canceling sounds through the speakers. The amplitude, phase, frequency and wavelength of the generated sound waves are selected to cancel the undesirable acoustic effects.

Fuel efficiency of many types of internal combustion engines can be substantially improved by varying the displacement of the engine. This allows for the full torque to be available when required, yet can significantly reduce pumping losses and improve thermodynamic efficiency through the use of a smaller displacement when full torque is not required. The most common method of varying the displacement today is deactivating a group of cylinders substantially simultaneously. In this approach no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during skip fire operation. For example, an 8 cylinder variable displacement engine may deactivate half of the cylinders (i.e. 4 cylinders) so that it is operating using only the remaining 4 cylinders. Commercially available variable displacement engines available today typically support only two or at most three fixed displacement modes.

In general, skip fire engine operation facilitates finer control of the effective engine displacement than is possible using a conventional variable displacement approach. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns.

Many skip fire controllers are arranged to provide a set of available firing patterns, sequences or firing fractions. In some circumstances the set of available firing patterns or fractions will vary as a function of various operating parameters such as engine load, engine speed and transmission gear. Typically the available firing patterns are selected, in part, based on their NVH characteristics. Transitions between firing fraction levels must be managed to avoid unacceptable NVH during the transition. In particular, changes in the firing fraction must be coordinated with other engine actuators to achieve smooth firing fraction transitions.

The Applicant, Tula Technology, Inc., has filed a number of patents describing various approaches to skip fire control. By way of example, U.S. Pat. Nos. 8,099,224; 8,464,690; 8,651,091; 8,839,766; 8,869,773; 9,020,735; 9,086,020; 9,120,478; 9,175,613; 9,200,575; 9,200,587; 9,291,106; 9,399,964, and others describe a variety of engine controllers that make it practical to operate a wide variety of internal combustion engines in a dynamic skip fire operational mode. Each of these patents and patent applications is incorporated herein by reference.

In some applications referred to as multi-level skip fire, individual working cycles that are fired may be purposely operated at different cylinder outputs levels—that is, using purposefully different air charge and corresponding fueling levels. By way of example, U.S. Pat. No. 9,399,964 (which is incorporated herein by reference) describes some such approaches. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of cylinder output level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. Three level (high, low, skip) cylinder output level modulation control may be characterized by a firing fraction (FF), which is the fraction of fired firing opportunities to total firing opportunities, and a level fraction (LF), which is the ratio of high firings to total firings. An effective firing fraction (EFF) can be determined as EFF=FF*LF+FF*R* (1−LF), where R is the ratio of the low firing output to the high firing output.

It should be appreciated that cylinder output level engine operation is different than conventional variable displacement in which when the engine enters a reduced displacement operational state, a defined set of cylinders are operated in generally the same manner until the engine transitions to a different operational state.

SUMMARY OF THE INVENTION

A variety of methods and arrangements are described for reducing vibration or noise generated from an internal combustion engine during skip fire or other cylinder output level modulation operation. In some embodiments, vehicle vibration is mitigated through the control of a variable spring absorber that is part of a powertrain that includes the engine. In some such embodiments, an absorption frequency of the variable spring absorber is tuned in a feed forward manner based at least in part on the current engine speed and a factor indicative of the minimum repeating pattern length associated with the current effective firing fraction (which in many implementations may be the denominator of the firing fraction). In other embodiments, one or more other firing characteristic associated with the cylinder output level modulation are used in the feed forward control. In various embodiments, the firing characteristic used in the feed forward control includes one of: a current operating firing fraction; a firing frequency engine order or a harmonic thereof; a denominator of the firing fraction; or a parameter indicative of any of the foregoing.

BRIEF DESCRIPTION OF THE DRAWINGS

The invention and the advantages thereof, may best be understood by reference to the following description taken in conjunction with the accompanying drawings in which:

FIG. 2A is a diagram of an engine exhaust system and a flow regulator control system according to a particular embodiment of the present invention.

FIG. 2B is a diagram of a flow regulator according to a particular embodiment of the present invention.

FIG. 3B is a flow diagram illustrating the location of two types of active mounts according to a particular embodiment of the present invention.

FIG. 4B is a flow diagram illustrating two example control paths for an active noise cancellation control system.

FIG. 9 is a table illustrating the determination of the minimum repeating pattern length for various combinations of firing fraction and level fraction.

In the drawings, like reference numerals are sometimes used to designate like structural elements. It should also be appreciated that the depictions in the figures are diagrammatic and not to scale.

DETAILED DESCRIPTION

The present invention relates generally to methods and mechanisms for reducing noise, vibration and harshness (NVH) generated by an internal combustion engine. The firing impulse arising from the combustion event and associated motion of the intake and exhaust valves generates both acoustic noise and vibrations. The NVH may have both a radiated component, which is transmitted through the air, and a structure-borne component, which is transmitted through the vehicle. More specifically, various implementations involve using known firing information in a skip fire or other cylinder output level modulation engine control system to reduce NVH. The firing information may include individual skip/fire decisions; individual firing level decisions; firing density/firing fraction related information; known firing sequences; firing order; etc.

In dynamic skip fire engine control system, each working chamber is not necessarily fired during every engine cycle. Instead, one or more selected working cycles of one or more working chambers are deactivated and one or more selected working cycles of one or more working chambers are fired. Individual working chambers are sometimes deactivated and sometimes fired. In various skip fire applications, individual working chambers have firing sequences that can change on a firing opportunity by firing opportunity basis. For example, an individual working chamber could be skipped during one firing opportunity, fired during the next firing opportunity, and then skipped or fired at the very next firing opportunity.

The operation of each working chamber is therefore quite different from the operation of a working chamber in a more conventional engine, in which each working chamber is steadily fired; for example, once every two engine revolutions for a 4 stroke engine. Because skip fire engine control can involve different working chambers with different firing sequences, there is a greater likelihood that low frequency, alternating firing patterns may be generated. Such firing patterns tend to produce undesirable acoustic effects.

An advantage of some skip fire engine approaches, however, is that information about future firing decisions are known before the firings actually take place. Various implementations of the present invention take advantage of this feature. More specifically, firing information is used in a wide variety of ways to reduce undesirable noise and vibration. For example, a firing fraction, firing order, firing sequence, firing sequence phase information or a firing decision for one or more working chambers may be used to control an active mount system, a variable rate absorber, an active noise cancellation system, an exhaust flow regulator/valve, a vibration damper, an active exhaust hanger and/or any of a variety of other types of dampers or mounts.

Figure 1A:
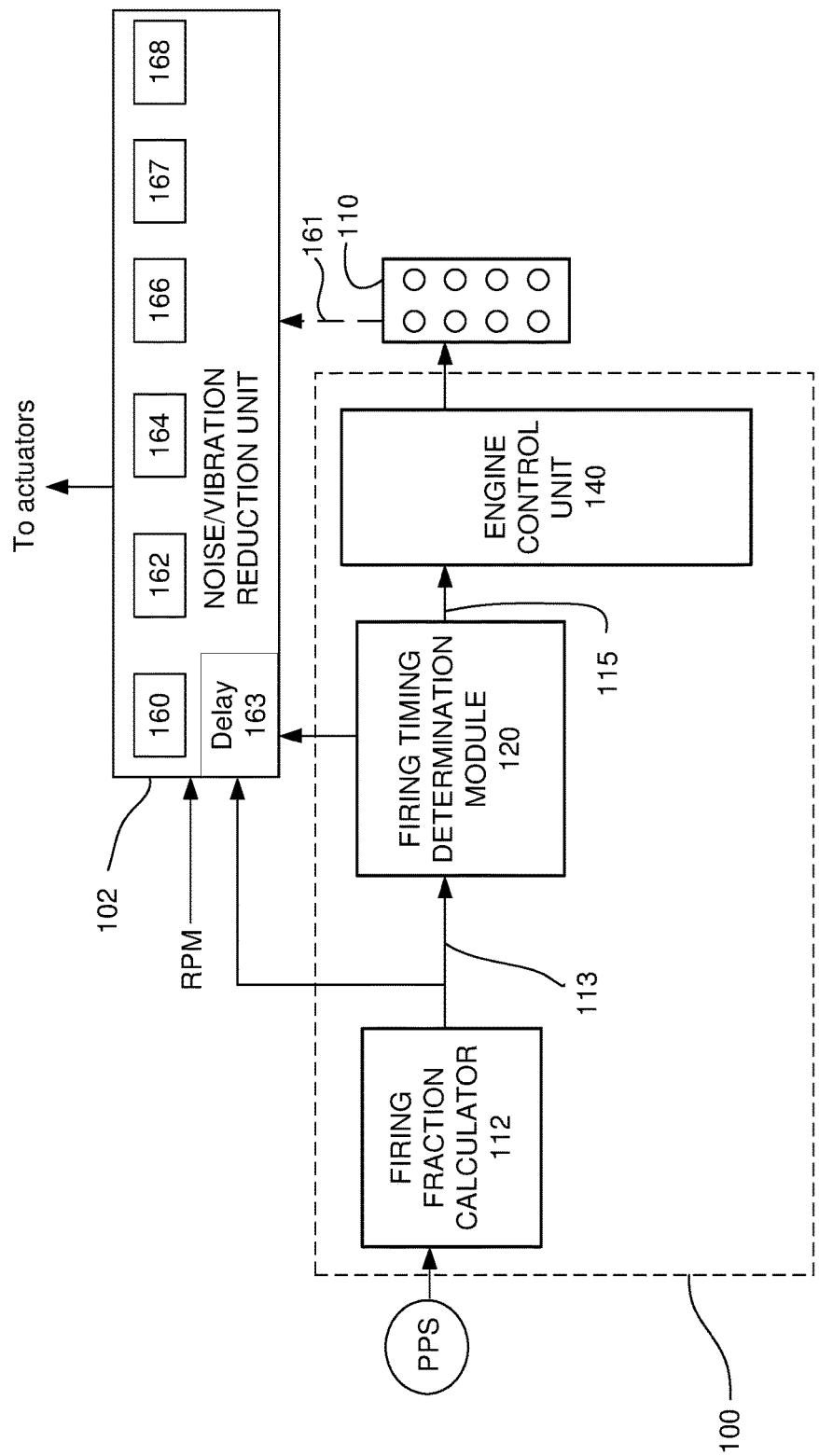
FIG. 1A is a block diagram of an engine controller and a noise/vibration reduction unit according to a particular embodiment of the present invention.

Referring initially to FIG. 1A, an engine controller 100 according to a particular embodiment of the present invention will be described. The engine controller 100 includes a firing fraction calculator 112, a firing timing determination module 120 and an engine control unit 140. The engine controller 100 communicates with a noise/vibration reduction unit 102 and an engine 110. The noise/vibration reduction unit 102 sends appropriate signals to the various actuators; i.e. engine mounts, exhaust flapper, cabin speakers, etc., to reduce the NVH experienced by vehicle occupants.

Initially, the firing fraction calculator 112 receives an input signal that is treated as a request for a desired engine output. The signal may be derived from a pedal position sensor (PPS) or any other suitable source, such as a cruise controller, an ECU, a torque calculator, etc. In some implementations, there may be an optional preprocessor that modifies the input signal prior to delivery to the firing fraction calculator, for example, to account for auxiliary device loads.

The firing fraction calculator 112 receives the input signal and is arranged to determine a skip fire firing fraction that would be appropriate to deliver the desired output under selected operating conditions. The firing fraction is indicative of the fraction or percentage of firings under the current (or directed) operating conditions that are required to deliver the desired output. In some preferred embodiments, the firing fraction may be determined based on the percentage of optimized firings that are required to deliver the driver requested engine torque (e.g., when the cylinders are firing at an operating point substantially optimized for fuel efficiency). However, in other instances, different level reference firings, firings optimized for factors other than fuel efficiency, the current engine settings, etc. may be used in determining the appropriate firing fraction. It should be appreciated that a firing fraction may be conveyed or represented in a wide variety of ways. For example, the firing fraction may take the form of a firing pattern, sequence or any other firing characteristic that involves or inherently conveys the aforementioned percentage of firings. The firing fraction calculator generates a commanded firing fraction 113, which is received by the firing timing determination module 120 and the noise/vibration reduction unit 102.

The firing timing determination module 120 is arranged to issue a sequence of firing commands (e.g., drive pulse signal 115) that cause the engine to deliver the percentage of firings dictated by the commanded firing fraction 113. The firing timing determining module 120 may take a wide variety of different forms. By way of example, sigma delta converters work well as the firing timing determining module. The sequence of firing commands outputted by the firing timing determining module 120 is passed to an engine control unit (ECU) 140 which orchestrates the actual firings. The firing timing determination module 120 is arranged to deliver a wide variety of firing information to the noise/vibration reduction unit. This may include, but is not limited to, the drive pulse signal 115 or a firing sequence, a firing decision for a particular working chamber, a signal indicating the number or identity of that working chamber, and/or the firing history of a selected working chamber. In various applications, this information can be directly sent between the noise/vibration reduction unit 102 and the firing timing determination module 120 or the noise/vibration reduction unit 102 may be able to infer this information. For example, if the firing timing determination module 120 sends a fire/skip signal to the noise/vibration reduction unit 102 additional information on the cam position may be sent over optional signal line 161. These two pieces of information, the fire/skip decision and the cam position would allow the noise/vibration reduction unit 102 to determine which cylinder is being fired/skipped.

The noise/vibration reduction unit 102 is arranged to utilize firing information (e.g., a firing fraction, firing order, minimum repeating pattern length, a drive pulse signal or firing sequence, firing sequence phase information, a firing decision (skip/fire; high/low; high/low/skip, etc.)), often in conjunction with the engine speed, to help reduce or eliminate NVH using a wide variety of different approaches. In the illustrated embodiment, for example, the noise/vibration reduction unit may include a flow regulator controller 160, an active mount controller 162, an active noise cancellation (ANC) controller 164, a vibration damper controller 166, an active vibration controller (AVC) 167, and an active exhaust hanger controller 168. These controllers use the firing information to adjust operating parameters for an exhaust valve/flow regulator, an active mount for the engine, an active noise cancellation system, a damper vibration control system, an active vibration controller system and an active exhaust hanger, respectively. For example, based on the firing information, the active mount may become more or less compliant and more or less damped, the flow regulator may be set to further allow or restrict exhaust flow, and the ANC may be configured to emit particular sounds that cancel noise generated by the engine. Put another way, the firing information indicates how one or more working chambers will be operated (e.g., skipped or fired) and the noise/vibration reduction unit is arranged to help mitigate the NVH effects of such operations. In the illustrated embodiment, the NVH control is feed forward in nature, since it uses information concerning upcoming firings to adjust various actuators in the noise/vibration reduction unit. In practice fire/skip decisions are generally made several firing opportunities, for example 3 to 10, prior to the engine executing the fire/skip command. In order to synchronize the various NVH mitigation controllers with the actual engine operation a variable delay block 163 may be incorporated into the noise/vibration reduction unit 102. Additional feedback elements may be added to the NVH control as required. It should be appreciated that the present invention is not limited to the above types of controllers and structures. Not all of these controllers, 160, 162, 164, 166, 167, and 168 need be incorporated into a vibration reduction unit 102. Only one or more controllers need be present and additional controllers may be present.

More generally, the noise/vibration reduction unit can be used to control any suitable mechanism that reduces NVH based on the firing information. Generally, the present invention contemplates the use of dynamic skip fire engine control. The assignee of the present application has filed multiple patent applications on a wide variety of skip fire and other engine designs, such as U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/953,615; 13/886,107; 13/963,759; 13/963,819; 13/961,701; 13/963,744; 13/843,567; 13/794,157; 13/842,234; 13/004,839, 13/654,244 and 13/004,844; and U.S. Provisional Patent Application Nos. 61/080,192, 61/104,222, and 61/640,646, each of which is incorporated herein by reference in its entirety for all purposes. Many of the aforementioned applications describe firing controllers, firing fraction calculators, filters, powertrain parameter adjusting modules, firing timing determining modules, and other mechanisms that may be integrated into or connected with the engine controller 100 and the noise/vibration reduction unit 102. In some cases the noise/vibration reduction unit 102 may also be integrated into the engine controller 100.

Figure 1B:
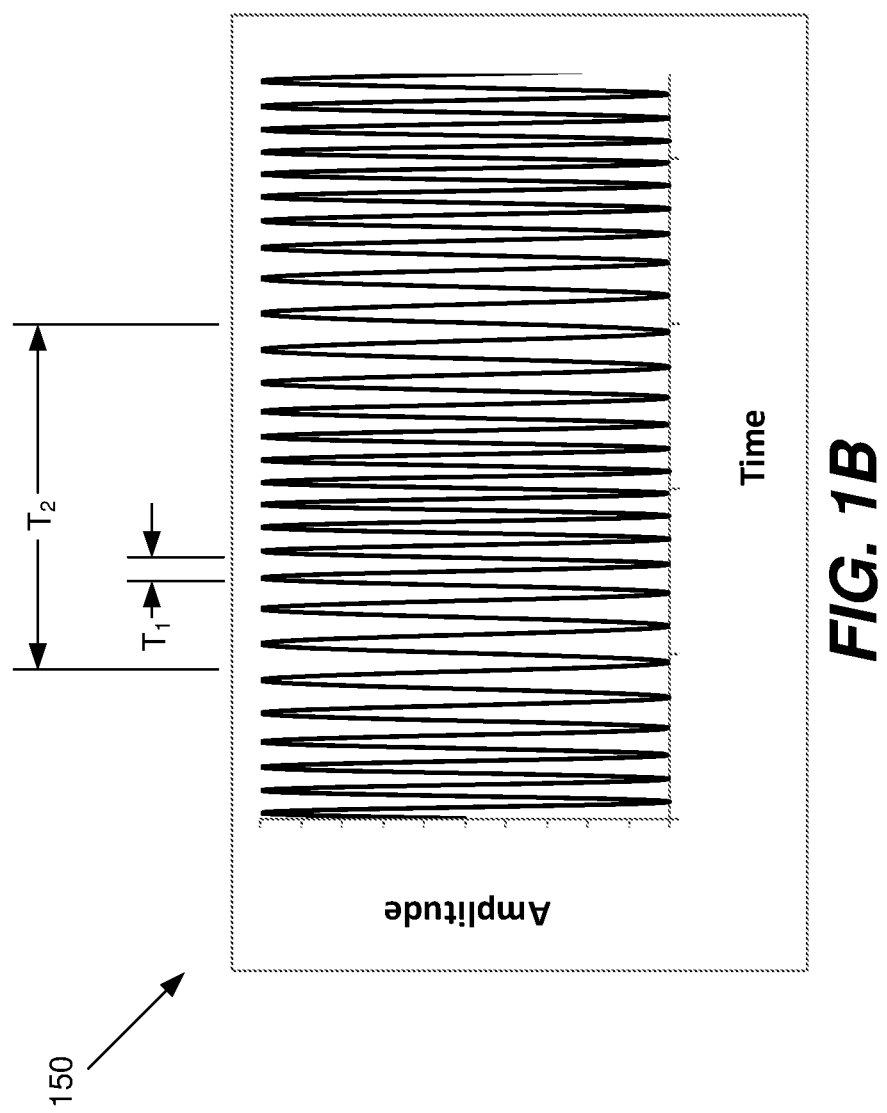
FIG. 1B is a representative pattern of acoustic pressure waves emanating from a vehicle tailpipe.

Referring next to FIG. 1B, a representative pattern of the acoustic pressure waves 150 emanating from a vehicle tailpipe will be described. The pressure wave is composed of a time varying pressure wave having a period $T_1$ frequency modulated by a lower frequency wave having a period $T_2$. The period $T_1$ may be associated with the rate of cylinder firing. For example, for an 8 cylinder engine operating at 2000 rpm (revolutions per minute) at a firing fraction of 0.33 the firing frequency is 44 Hz corresponding to a period between successive cylinder firings ($T_1$) of 22.7 milliseconds. The value of $T_1$ will obviously change depending on the firing fraction, engine rpm, and number of cylinders. As described in U.S. patent application Ser. No. 13/886,107 path length differences in the exhaust system between the various cylinders can give rise to beating effects as shown in FIG. 1B. The beating modulates the noise emanating from the cylinder firings at a frequency $T_2$, where $T_2$ is greater than $T_1$. A representative value for $T_2$ may be 250 milliseconds; however, higher or lower values may be present depending on the exhaust path layout and engine operating characteristics. The systems described below to actively cancel undesirable noise or vibration may be designed to lessen the perception of the acoustic pattern shown in FIG. 1B on vehicle occupants and individuals in the vicinity of the vehicle. The pattern shown in FIG. 1B is representative only and these systems may be designed to compensate for other acoustic patterns and vibrations as described below.

Referring next to FIG. 2A, a flow regulator control system 200 according to a particular embodiment of the present invention will be described. The flow regulator control system includes the engine controller 100 and the flow regulator controller 160. The flow regulator controller 160 communicates with and controls a flow regulator 202 situated in a tailpipe 206 of a vehicle exhaust system 204.

The flow regulator 202 helps control the exhaust flow rate through a line 208 that connects the engine 110 to the tailpipe 206. The flow regulator 202 may take a wide variety of forms. One example of a flow regulator is shown in FIG. 2B. In the illustrated embodiment, the flow regulator 202 includes a flap 212 whose position can be adjusted to further restrict or allow exhaust flow. A variable spring may also be used to position and modify the damping characteristics of the flap 212. Some designs allow for a predetermined number of possible positions, each of which allows exhaust flow to a different degree. The control for the flow regulator may be handled in any suitable manner (e.g., pneumatically, electronically, etc.).

If properly calibrated, the flow regulator 202 can help reduce undesirable acoustic effects generated by skip fire engine control. These acoustic effects can be particularly problematic in a vehicle in which exhaust gases from different banks have different distances to travel to the tailpipe. To provide an illustrative example, consider the engine in FIG. 2A. The working chambers in this example are arranged in two banks, a first bank 214 that includes working chambers 1, 3, 5 and 7 and a second bank 216 that includes working chambers 2, 4, 6, 8. Each bank is connected via a Y pipe to the tailpipe 206. Because of the arrangement of the banks and the exhaust system, exhaust from the first bank 214 has a greater distance to travel to the tailpipe 206 than exhaust from the second bank 216.

This type of arrangement can be problematic when certain fractions of the working chambers are fired. In particular, problems can occur when firings occur in one bank and then the other in an alternating, regular pattern. For example, consider a situation in which the engine is fired in the order 1-8-7-2-6-5-4-3 during all cylinder operation, i.e. a firing fraction of 1. If the firing fraction is ⅓ and involves firing every third working chamber and skipping the next two working chambers, then the order of combustion events could be 2-4-8-6-3-7-5-1.

The combustion events for working chambers 3-7-5-1 are all from the first bank 214 and the other combustion events (2-4-8-6) are all from the second bank 216. In this situation, the engine alternates between four firings on one bank and four firings on the other bank. The sounds generated by the first bank 214 are delayed relative to the second bank 216 due to the different distances that the sounds need to traverse from their respective banks to reach the end of the tailpipe. This arrangement can lead to low frequency, beating/modulating sound patterns as shown in FIG. 1B. These modulated patterns can be perceived as annoying by vehicle occupants.

Since particular firing fractions and engine arrangements are known to generate certain problematic patterns, the flow regulator is arranged to use firing information to help reduce or eliminate acoustic effects associated with those patterns. By limiting the passage of pressure waves emanating from the engine, the flow regulator, when properly calibrated, can reduce or eliminate undesirable noise generated by the combustion process. In the illustrated embodiment, for example, the flow regulator controller receives a firing fraction (e.g., firing fraction 113 of FIG. 1) from the engine controller 100. Some approaches involve receiving other types of firing information instead of or in addition to the firing fraction (e.g., a firing sequence, firing decision, etc.) The flow regulator may receive a wide variety of other inputs 220 as well, including but not limited to the cam position and the manifold absolute pressure (MAP), which can be used to determine the MAC. Restrictions of the exhaust path by the flow regulator may lead to increased cylinder back pressure and decreased fuel efficiency. Accordingly, flow regulator usage must be a balance between achieving both acceptable NVH and fuel efficiency performance.

Based on these inputs, the flow regulator controller 160 adjusts the flow regulator 202 so that the acoustic effects associated with the received firing information are dampened or eliminated. This may be performed in a wide variety of ways, depending on the needs of a particular application. In one implementation, for example, one of multiple positions for the flow regulator (e.g., positions of the flap 212) is set based on the firing information. The flow regulator may be adjusted using any suitable mechanism, such as through the use of a stepper motor. Alternatively, a spring load of the flap 212 may be varied depending on the firing fraction. Although FIGS. 2A and 2B illustrate particular types of flow regulators and exhaust systems, it should be appreciated that the present invention may be used with a wide variety of devices and structures. In some embodiments, for example, the flow regulator may not involve a flap, but uses a different mechanism for variably limiting exhaust flow. Various approaches involve a flow regulator that can alternatively severely restrict or entirely allow exhaust flow. In other approaches, the flow regulator has multiple possible settings that each restrict exhaust flow to a different degree. The flow regulator may also be situated in almost any suitable location in the exhaust system, such as closer to the engine or in one tailpipe of a dual tailpipe design. More generally, the present invention may be modified to suit a wide variety of exhaust and engine arrangements, including ones that depart from what is shown in FIG. 2A.

Similar to the use of a flow regulator in the exhaust system, a damper (not shown) may be situated in the engine air induction path to dampen noise generated by the inrush of air into cylinders associated with the opening of the intake valve. The damper may be situated in the air induction path to absorb or redirect this noise. The damper position may vary with the firing fraction or it may vary more quickly in response to the peaks and troughs of the acoustic wave. In some cases the engine throttle may be used as an acoustic damper and a separate damper is not required. When a separate induction damper is used it can take the form of a shutter positioned in front of an air filter; an induction control valve or flapper or other suitable form. The appropriate damper position can be determined in any desired manner By way of example, look-up tables may provide the desired damper position based on the firing fraction or an indicia indicative thereof (e.g. engine order); or based on multiple factors (e.g., firing fraction, engine speed, MAC).

Although flow regulator control has been described primarily in the context of skip fire operation, it should be appreciated that similar low frequency acoustic variations can occur during multi-charge level engine operation and/or multi-level skip fire engine operation and similar flow regulation control can be utilized to mitigate the impact of such low frequency acoustic variations.

Figure 3A:
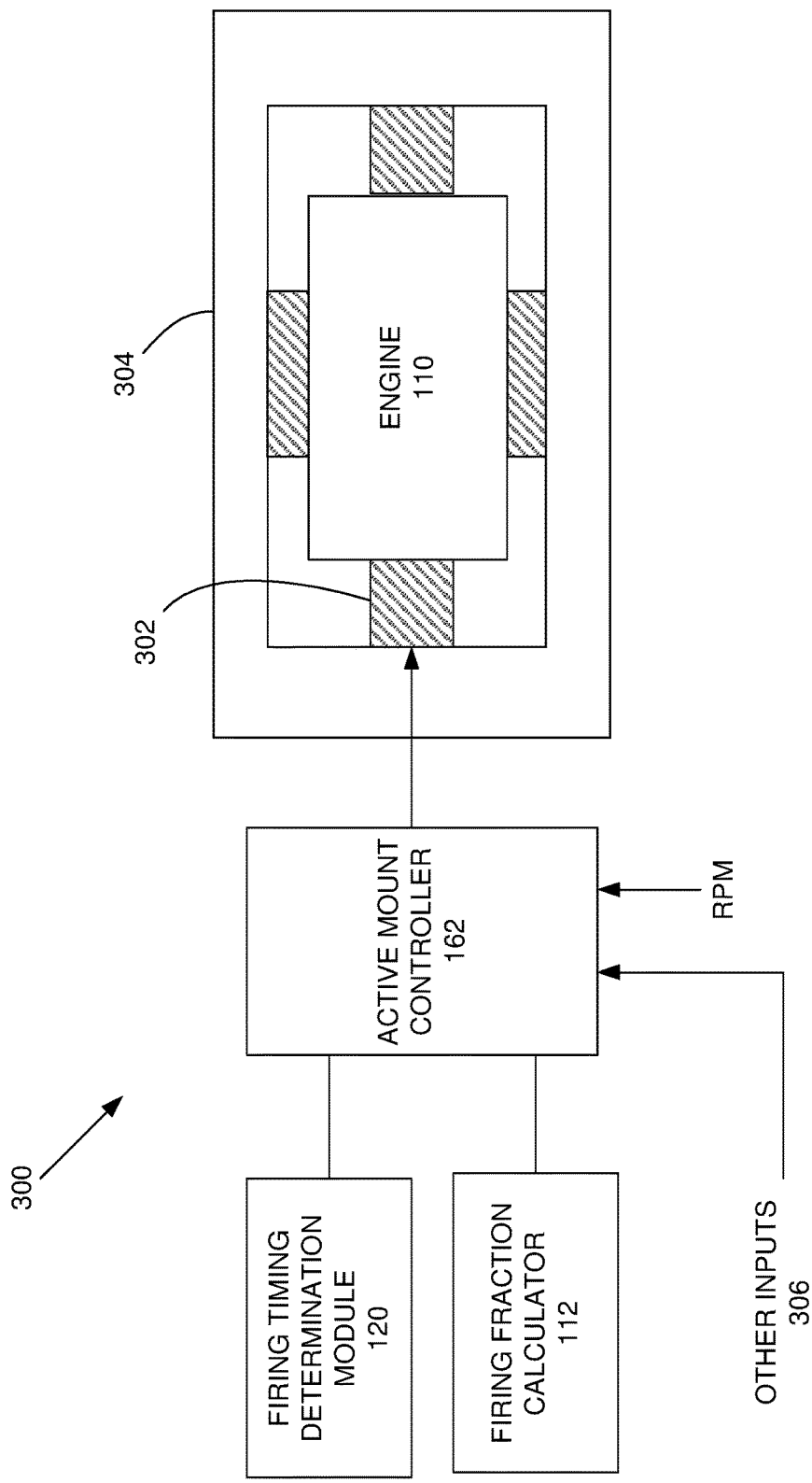
FIG. 3A is a flow diagram illustrating an active mount control system according to a particular embodiment of the present invention.

Referring next to FIG. 3A, an active mount control system 300 according to a particular embodiment of the present invention will be described. The active mount control system 300 includes the firing timing determination module 120, the firing fraction calculator 112, and the active mount controller 162. The active mount controller 162 is arranged to control (e.g., adjust the compliance and/or damping) of the active mounts 302, which physically support the engine 110 or some other vehicle component and couple it to the chassis 304 of a vehicle. Properly configured, the active mounts 302 can help reduce vibration and shaking caused by the engine 110 or some other vehicle component.

The active mount controller 162 receives firing information (e.g., a firing fraction, engine order, firing sequence, indication of a firing decision, current cylinder number, etc.) from any suitable component, such as the firing timing determination unit 120 and the firing fraction calculator 112. There are a number of other factors that contribute to engine vibration in addition to the firing decisions and the active mount controller 162 is arranged to receive other inputs 306 indicative of operating parameters that are relevant to its calculations. One particularly important factor is engine speed (labeled RPM). In various implementations, for example, the active mount controller receives inputs 306 indicating one or more of the mass air charge (MAC), cam settings, manifold absolute pressure (MAP) and/or any other suitable parameters. These parameters are relevant to the calculation of the impulse that would be expected from any particular firing opportunity. Based on such information, the active mount controller 162 is arranged to determine an appropriate setting and send appropriate control signals to the active mounts 302 to adjust the mounts appropriately.

The present invention contemplates a wide variety of control mechanisms that translate the aforementioned inputs into particular adjustments of the active mount. Under particular conditions, for example, as the firing fraction and/or the engine speed increases, the active mount controller sends control signals to stiffen and/or dampen the active mount in order to reduce transmitted motion and vibration. As the firing fraction and/or the engine speed decreases, the active mount may be made more compliant, so that engine vibration is better absorbed. However, with skip fire engine control, some higher firing fractions may also introduce low frequency vibration, depending on the firing sequence that is used. The active mount controller is arranged to adjust the active mount (e.g., make it more compliant) to address particular firing fractions or sequences that generate such vibration.

The operation and structure of the active mount may vary widely, depending on the needs of a particular application. In some embodiments, for example, the active mount is electrically, hydraulically or vacuum controlled. Some active mounts utilize an electroactive polymer or an electrorheological fluid. In response to certain kinds of anticipated firing operations, the active mount controller is arranged to selectively expose the fluid or polymer to an electric field which modifies the stiffness and/or damping properties of the mount. The electric field is adjusted to control the degree of stiffness and/or damping properties of the active mount.

In some approaches, it is useful for the active mount controller to involve a feed-forward control system, rather than a closed loop feedback system. A closed loop feedback system for active mount management is used in some prior art vehicle designs. For example, some vehicles use an accelerometer to detect engine vibration, and then use the feedback from the accelerometer to adjust the active engine mount. A characteristic of such feedback-based approaches is that the corresponding transfer algorithm is more effective for some types of operating modes rather than others. Thus, a feedback-based approach can work well for conventional engine control systems in which the operational parameters do not rapidly change and engine operation can be characterized by a few operational modes. In some skip fire engine implementations, however, the operational characteristics of the engine may sharply alter from one working cycle to the next, which can make the use of a feedback-based system less desirable.

The firing information that informs the active mount adjustment may include a firing fraction, an engine order, a firing sequence, firing sequence phase information and/or a discrete fire/no fire decision for a particular working chamber, etc. Some implementations of the active mount controller are arranged to make adjustments to the active mount on a working cycle by working cycle basis. These implementations require a high bandwidth active mount capable of adjustment at frequencies greater than of the firing opportunity frequency, often >100 Hz. In other implementations the active mount may have a lower bandwidth, i.e. 10 Hz or less, and may be adjusted in response to changes in the firing fraction. More generally, firing information about future firing decisions is provided to the active mount controller before those firing decisions are actually implemented in the engine. As a result, the active mount, rather than being purely reactive, may stiffen and/or become more highly damped in anticipation of such decisions, which improves the mount's ability to reduce undesirable vibration or motion.

Some designs for the active mount controller involve a finite impulse response (FIR) filter. While use of a FIR filter is advantageous because its transfer coefficients may be readily determined, other types of filters may be used. A particular example of such an active mount controller 162 is illustrated in FIG. 3B. The active mount controller 162 includes an FIR filter 350 and an active engine mount adjustment module 352. The FIR filter 350 may receive any of the aforementioned types of firing information. In this particular example, the FIR filter 350 receives signals in the form of discrete pulses, where a pulse represents a particular firing event. The magnitude of the pulse may correspond to the size of the firing event, as determined by the amount of air and fuel used. The lack of a pulse indicates a skip of a working cycle for a working chamber, although it should be appreciated that in other implementations the inputs to the FIR filter may take different forms. The output of the FIR filter 350 is based on the received pulses and the filter coefficients, which assign a weight to each pulse. The coefficients may be fixed at production or be adjustable depending on operating parameters of the engine. The output of the FIR filter 350 is received at the active mount adjustment module 352. The active mount adjustment module 352 then orchestrates changes to the active mount based on the FIR filter output. It should be appreciated that in various embodiments the active mount controller 162 receives the pulse information prior to the actual firing or skipping of the cylinder, so that the active mount adjustment module can be adjusted in advance of or coincident with the actual cylinder firing. Since each working chamber can influence the mounts in different ways, each working chamber may have an associated FIR to optimize suppression of NVH originating from that working chamber.

Figure 3C:
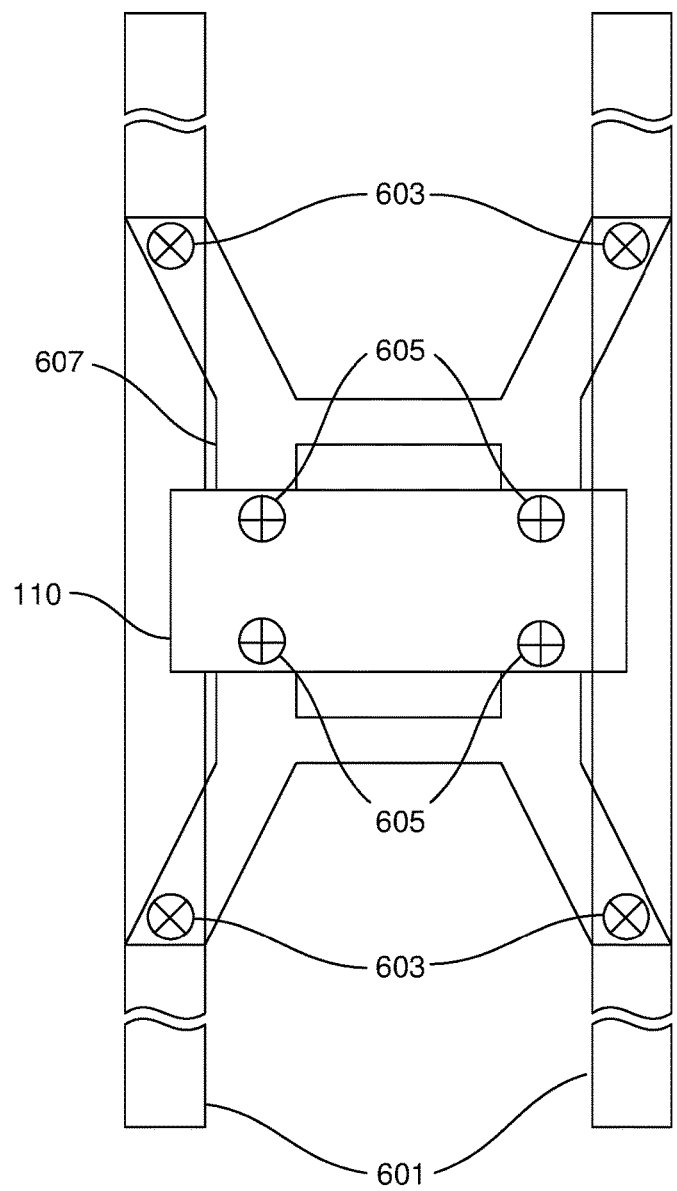
FIG. 3C is a diagram illustrating active engine mounts and active engine sub-frame to frame mounts according to a particular embodiment of the present invention.

Similar to the use of an active engine mount to dampen transmission of noise and vibration from an engine to its mounting structure, active mounts may be situated at other locations in the vehicle. As shown in FIG. 3C, one or more active mounts 603 may be situated between an engine sub-frame 607 and vehicle frame members 601. The exemplary system shown in FIG. 3C has four engine sub-frame to frame active mounts 603. Also shown in the figure are four active engine mounts 605 between the engine 110 and engine sub-frame 607. One or more active mounts may also be situated between the chassis frame and body (not shown in FIG. 3C).

Figure 3D:
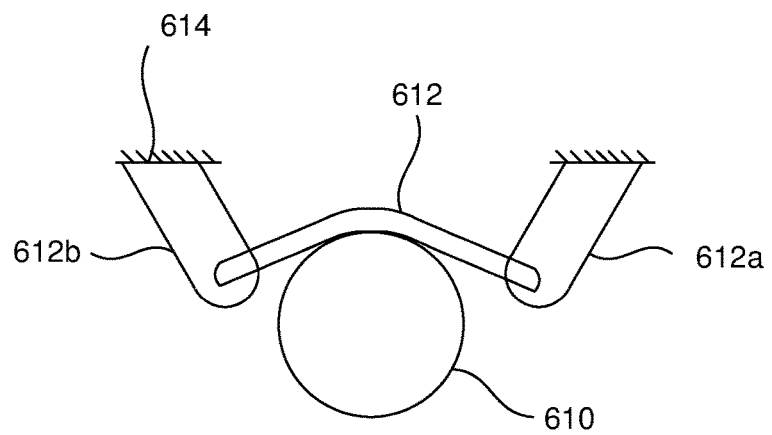
FIG. 3D is a diagram illustrating an active exhaust hanger according to a particular embodiment of the present invention.

Similarly one or more active mounts may be configured as an active exhaust hanger to support the exhaust system of a vehicle as shown in FIG. 3D. An exhaust hanger 612 may be permanently bonded to an exhaust pipe 610. The exhaust hanger 612 may be supported by two active mounts 612a and 612b that attached to the vehicle frame 614. One or more of these or similar active exhaust hangers may to used to support the exhaust system along the vehicle undercarriage. For example, three to five active exhaust hangers may be used, although more or less may be used in some cases. In an analogous manner active mounts may also be used to support a transmission or powertrain and may be incorporated into the vehicle shock absorbers (not shown in FIG. 3D). Controlling active shock absorbers or suspension dampers based on the firing information may help to reduce and control low frequency vehicle body movement. The stiffness and/or damping of any of these mounts may vary with the firing fraction or some other attribute of skip fire operation.

The described active mount controller 300 is a feed forward control unit that adjusts the stiffness of the mounts based on the current operating conditions in order to reduce expected vibrations. When desired, feedback of the resulting vibrations can be used to make the controller adaptive to further improve the response. To facilitate such feedback, accelerometers can be place at strategic locations on the chassis or vehicle body and their respective signals can also be provided to the active mount controller 300.

In the discussion above, a few references have been made to engine order. Engine order is a normalized frequency where the normalization is relative to the frequency corresponding to one revolution of the engine crankshaft. Thus, for example, a conventional four stroke, four cylinder piston engine operating in a normal (non-skip fire) mode would have a firing frequency that occurred at the second engine order (2E) because two cylinders fire each crankshaft rotation. Thus the firing frequency would be twice the engine crankshaft rotation frequency (E). Similarly, a six cylinder engine would have a firing frequency having an order of three (3E), while an eight cylinder engine would have a firing frequency having an order of four (4E). With skip fire operation, fractional orders are often utilized. For example, a four-stroke, eight cylinder engine operating at a firing fraction of ⅓ would have a firing frequency order of four thirds (4/3E) meaning that on average, 1⅓ cylinders are fired every rotation of the crankshaft. It should be appreciated that whatever the firing frequency order harmonics and possibly sub-harmonics of this order will also be generated. Generally these associated harmonic frequencies need to be considered, and in some cases mitigated, to obtain acceptable vehicle NVH performance.

Many skip fire controller are constrained to allow a defined set of available firing fractions, patterns or sequences. By way of example, the Applicant has implemented a skip fire controller having 29 available firing fractions that may be used when conditions permit, with their associated firing sequences being constrained to fire in a most evenly spaced manner whenever possible. The available fractions include any fractional value between zero and 1 having a denominator or 9 or less—e.g., 0, ⅑, ⅛, 1/7, ⅙, ⅕, 2/9, ¼, 2/7, ⅓, ⅜, ⅖, 3/7, 4/9, ½, 5/9, 4/7, ⅗, ⅝, ⅔, 5/7, ¾, 7/9, ⅘, ⅚, 6/7, ⅞, 8/9 and 1. Each of these firing fractions has an associated firing fraction engine order and thus the controller has a defined set of operational orders. More generally, most any skip fire controller with a defined set of available firing patterns will typically have a corresponding defined set of available firing fraction orders. Thus, the current firing fraction operating order can readily be reported to, or determined by the active noise cancellation controller 164, the active mount controller 162 or other suitable controller. It should be appreciated that in the exemplary controller, the engine order associated with many of the possible firing fractions will be a fractional order. For example, an 8-cylinder engine operating at a firing fraction of 2/7 would have an order of 8/7E.

The engine order associated with any given operational firing fraction is a construct that is useful in designing filters suitable for use in NVH management. This is because the firing frequency will be the order times the engine speed and firing frequency is central to skip fire induced NVH issues. By way of example, the filter coefficients that are appropriate for operation at a particular firing fraction may be based upon the order and the engine speed (RPM) with the appropriate filter coefficients being stored in a look-up table (LUT) having two indices—order and engine speed. If a digital filter is used with a variable clock based on engine speed, the appropriate filter coefficients can be stored in a one dimensional look-up table based on engine order. Since the engine order is based on the firing fraction, the firing fraction or any other parameter indicative of firing fraction can be used as the index as well.

In many applications, the settings of the active engine mounts may be based primarily on the firing fraction (engine order) and the engine speed. In such a system, the appropriate mount settings for any particular skip fire operating condition can readily be retrieved from a lookup table based on those two parameters. In other embodiments, additional operating conditions such as mass air charge (MAC), or settings indicative thereof can be used as another dimension for such tables. Of course, in other embodiments, the appropriate settings can be determined algorithmically or using data structures other than lookup tables.

Although the feed forward active engine mount control described above has been described primarily in the context of skip fire operation, it should be appreciated that similar types of vibration can occur during multi-charge level engine operation and/or multi-level skip fire engine operation and that similar control of active engine mounts can be utilized to mitigate the impact of such cylinder output level modulation induced vibrations.

Figure 4A:
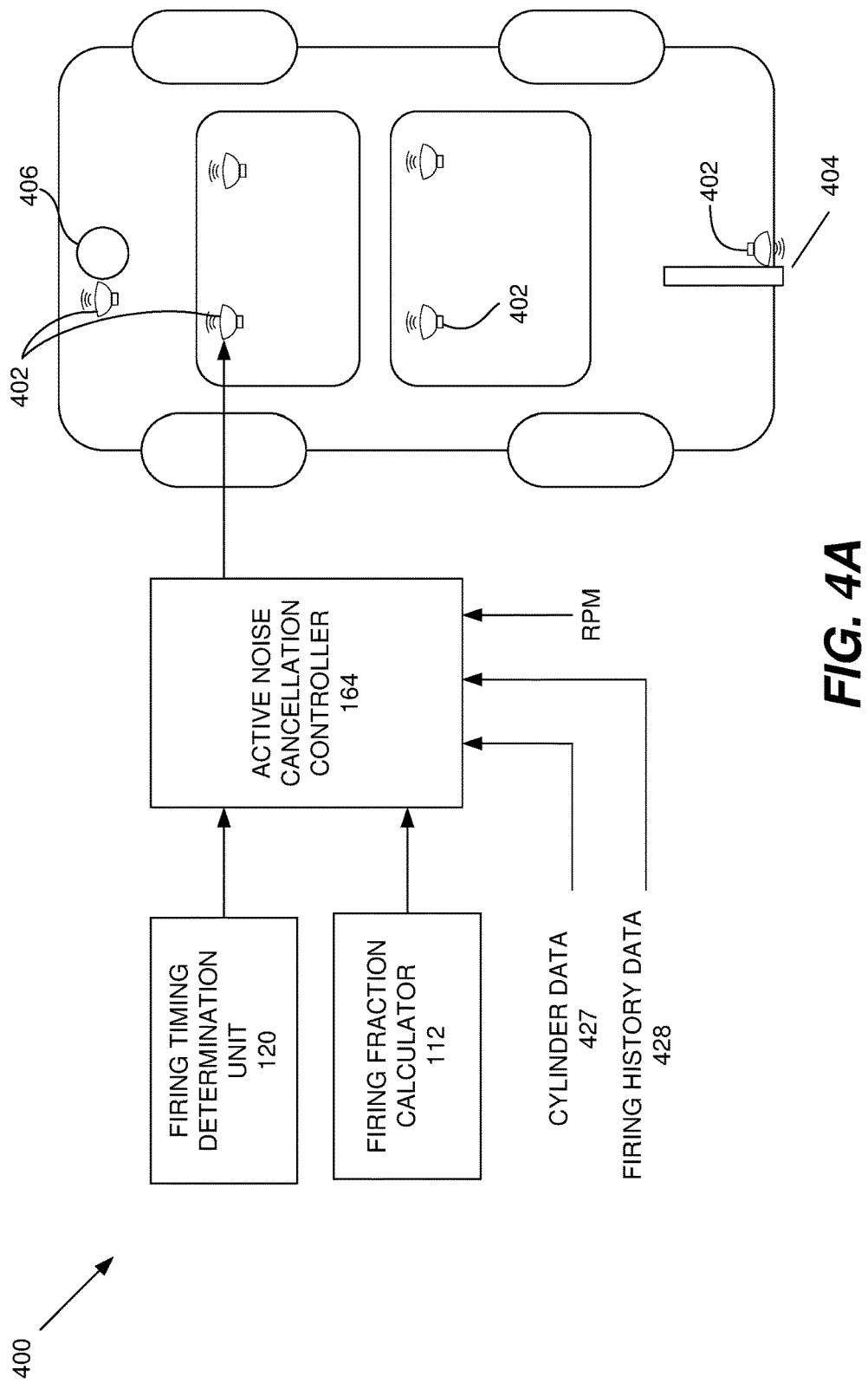
FIG. 4A is a flow diagram illustrating an active noise cancellation control system according to a particular embodiment of the present invention.

Referring next to FIG. 4A, an active noise cancellation system 400 according to a particular embodiment of the present invention will be described. The active noise cancellation system 400 includes the firing timing determination unit 120, the firing fraction calculator 112 and the active noise cancellation controller 164. The active noise cancellation controller 164 is connected with one or more speakers 402 situated in a vehicle. The speakers 402 may be situated in any location in the vehicle where noise cancellation is desired, including but not limited to a location near the driver seat, front passenger seat, rear passenger seats, engine air intake 406 and/or the exhaust tailpipe 404. In addition speakers may be placed at various locations in the passenger cabin. Often the noise cancellation system 400 will simply use the audio system cabin speakers that would otherwise be present in the vehicle.

The active noise cancellation controller 164 is arranged to control the speakers so that they emit sounds that cancel out undesirable acoustic effects generated by the engine. The wavelength, amplitude, frequency and other characteristics of the canceling sounds are based on firing information received by the active noise cancellation controller 164. As previously discussed, the firing information may involve any suitable information related to future operation of the working chambers of the engine. In the illustrated embodiment, for example, the firing fraction calculator 112 sends firing fraction and/or engine order information to the active noise cancellation controller 164 while the firing timing determining unit 120 sends firing sequence/decision and/or phase information to the active noise cancellation controller. The exact parameters of the cancelling sound waves may be determined using any suitable mechanism, such as a lookup table. The active noise cancellation controller 164 then orchestrates the emission of the canceling sounds from the speakers 402. As a result, the emitted canceling sounds at least partially cancel the noise generated by those engine operations that were characterized by the aforementioned firing information.

The noise generated by the firing or operation of a particular working chamber may be affected by engine speed and distinctive characteristics of a particular working chamber (e.g., its relative position in the engine or vehicle) and its firing history. Some implementations take this into account in determining a suitable noise cancelling sound. In the illustrated embodiment, for example, the active noise cancellation controller 164 receives a firing decision with respect to a particular working chamber as well as information indicating the identity or number of the working chamber (cylinder data 406), as well as firing history data 408 on the working chamber. The firing history data may take a variety of forms. For example, the firing history data may indicate a number of skips or fires over a predetermined number of consecutive working cycles. The active noise cancellation controller 164 then determines a noise cancelling sound based on the above information.

Referring next to FIG. 4B, a flow diagram describing methods for generating noise cancelling sounds according to a particular embodiment of the present invention will be described. More specifically, the flow diagram compares a prior art method against a particular implementation of the present invention. Prior art sound cancellation apparatus 401 describes a prior art approach. In this approach, undesirable noise is generated by a particular sound source 409, such as the engine. The sound is heard in a cabin of a vehicle and detected by a microphone 407. A signal generated in the microphone 407 is directed to the noise cancellation controller 410. The noise cancellation controller 410 directs a signal to speaker 414 that seeks to cancel the noise generated by the sound source in certain regions, particularly occupied regions of the vehicle cabin. This process, however, involves various delays, shown schematically in block 408. The delays arise from the transit time of the sound from the source to the microphone, the transmission of the signal from the microphone to the noise cancellation controller, processing in the noise cancellation controller and lag in the speaker response to signal input from the noise cancellation controller.

Noise cancellation apparatus 411 describes a particular implementation of the present invention. In this approach, firing information is generated in an engine controller 100. This information is inputted both to the sound source 409 (typically the engine) and into a suitable model 416 that may be incorporated as part of an active noise cancellation controller 417. The active noise cancellation controller 417 generates a signal that is directed to speaker 414. The firing information allows the active noise cancellation controller 417 to potentially determine a suitable noise cancelling sound before the sound reaches the cabin or region of interest. As a result, delay 408 is mitigated and the noise may be canceled before it is heard by occupants of the vehicle. In some cases the speaker 414 may emit the noise cancellation sound substantially synchronized with the firing impulse from the internal combustion engine. The relative timing of the noise cancellation sound to the firing impulse may be adjusted so that the sound from the firing impulse and noise cancellation sound arrive substantially simultaneously at the ears of the vehicle occupants. The variable delay block 163 (FIG. 1) is one method to provide the appropriate delay to synchronize the noise mitigation with the engine operation.

Figure 4C:
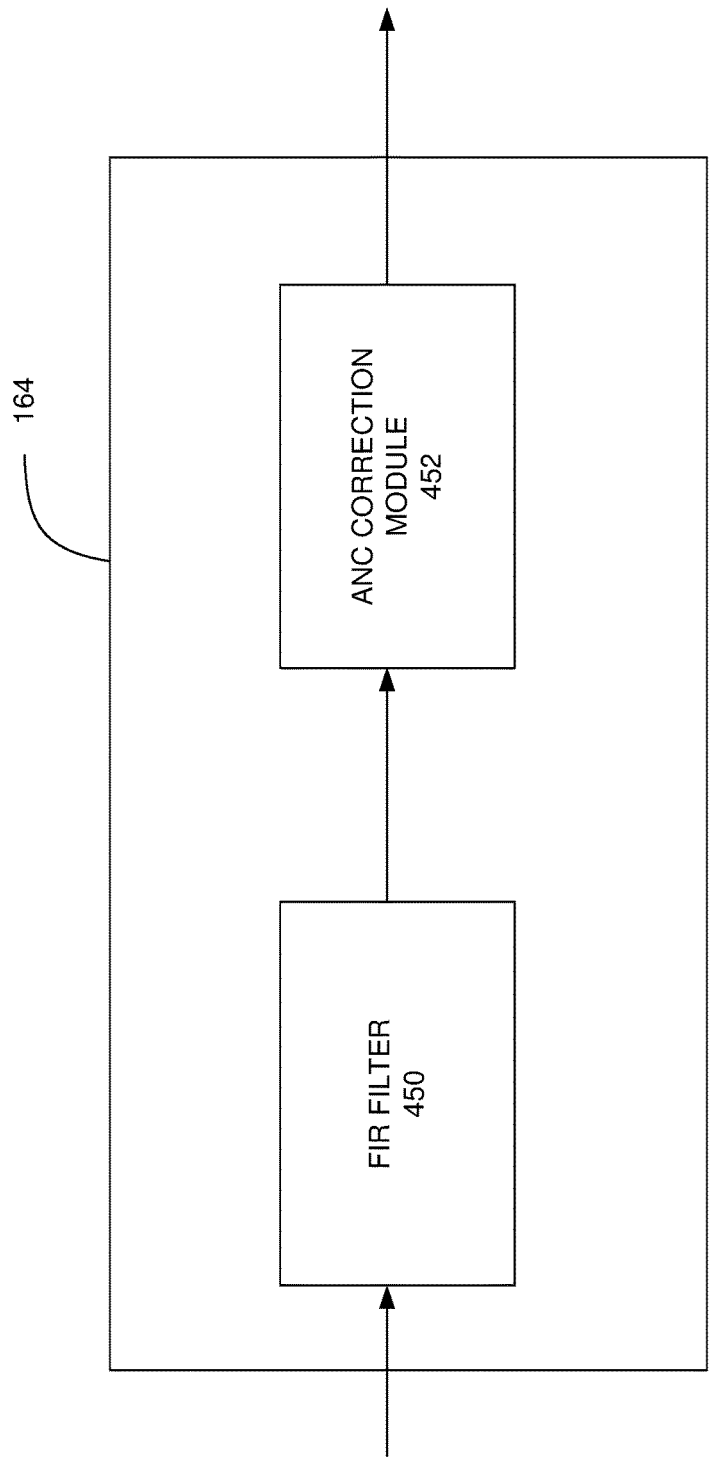
FIG. 4C is a flow diagram illustrating an active noise cancellation controller with a finite response filter according to a particular embodiment of the present invention.

The active noise cancellation controller 164 may determine a suitable noise cancelling sound in a wide variety of ways, depending on the needs of a particular application. FIG. 4C illustrates one such implementation. In FIG. 4C, the active noise cancellation (ANC) controller 164 includes a finite impulse response (FIR) filter 450 and an ANC correction module 452. Firing decisions may be represented in the form of pulses or a pulse wave. In various implementations, a pulse signal represents a firing event, while an absence of a pulse signal indicates a skip of a working chamber. The signals are then used as an input to the FIR filter 450. The output is then sent to the ANC correction module 452. The ANC correction module 452 determines a suitable noise cancelling sound based on the received filter output. The FIR filter coefficient values may be fixed or adaptive. Fixed values may be chosen based on acoustic modeling or calibration data. Adaptive values may be chosen using appropriate cost function(s) to minimize the noise. Least Mean Squares (LMS) and Recursive Least Squares (RLS) are suitable algorithms for filter adaptation, although other optimization algorithms can also be used. It should be appreciated that the above example describes only one possible implementation of the active noise cancellation module with an FIR filter, and that various modifications, such as an additional filters, a different input set or calculation methodology, one FIR filter per working chamber are also possible.

Skip fire and other cylinder output level modulation operation tends to have multiple periodic components that can contribute to undesirable sounds and the phase of such periodic components is important for active noise and/or vibration control. To illustrate the issue, consider a firing sequence that would occur when a firing fraction of ⅖ (40%) is used with a constraint of most even possible spacing of the firings. In that circumstance the resultant firing pattern would be: FssFs. That is, one fire (F) is followed by two skips (s), and the following fire (F) is followed by a single skip (s), before the pattern is repeated. Thus, the FssFs pattern that repeats over the course of five firing opportunities is one recurring pattern that has associated acoustic and vibratory characteristics. In addition, the specific cylinders that are being fired at any time will have their own associated effects which are also periodic in nature. For example, consider an 8 cylinder engine having a firing order of cylinders 1-8-7-2-6-5-4-3. When operated at the described 40% firing fraction, the engine has a specific cylinder firing sequence that repeats itself every five engine cycles as illustrated below. This recurring pattern also has associated acoustic and vibratory characteristics.

| 18726543 | 18726543 | 18726543 | 18726543 | 18726543 |
|---|---|---|---|---|
| FssFsFss | FsFssFsF | ssFsFssF | sFssFsFs | sFsFssFs |

In practice any particular repeating firing fraction or sequence may have multiple frequencies of concern. To accommodate this, the active noise cancellation (ANC) controller 164 may include a set of filters 450 (e.g., multiple FIR filters), with each filter being configurable to address a particular frequency (or engine order) of concern in the current operational state. The filters may be arranged in parallel, so that any output is always available and from this set the particular output used is based on the firing fraction or frequencies of concern. This ability to target frequencies/orders of concern at the same time is a particularly powerful tool in reducing noise (and vibrations) during skip fire operation. In theory, any number of filters 450 can be provided to handle different frequencies of concern. However, in general, a limited number of frequencies are of concern. For vibrations generally the fundamental or perhaps the second and/or third order frequencies need to considered, since human body perception is greatest at low frequencies (1-10 Hz). Human tactile vibration perception is important for the steering wheel and here frequencies in the 1-250 Hz range should be considered. Human acoustic perception extends to higher frequencies and frequencies>250 Hz should be considered for acoustic noise mitigation. Human sound perception, psychoacoustic, is often complex and whether a sound is pleasing or unpleasant often needs to be determined empirically. Obviously the transfer paths between the NVH sources and the vehicle occupants also needs to be considered in determining the potential impact of various frequencies. Regardless the frequency(ies) of concern for any particular firing fraction/engine order and engine speed combination, the appropriate filter coefficients can readily be determined experimentally. Of course, if a sufficiently accurate acoustic model is available, the appropriate filter coefficients could be determined by mathematical modeling.

When actively controlling sound or vibration characteristics associated with skip fire operation of an engine, it can also be important to know the pattern phase of any firing pattern that may be in use. That is, the location within a repeating pattern in relation to repeating engine cycles. Such pattern phase information can be provided by the firing timing determining module 120 or any other suitable source. Additionally information regarding spark and intake/exhaust valve timing may be used to accurately synchronize the sound modifying device with the engine. Information regarding cylinder mass air charge (MAC) may additionally be used to determine the proper magnitude for the sound produced by the sound modifying device. Larger MAC values are generally associated with louder engine produced noise and thus the magnitude of the sound produced by the sound modifying device must also be increased to effectively cancel the engine noise. Information on the MAC and timing can be provided by the signal line 161 or any other suitable source.

Many sound cancellation systems utilize multiple speakers (e.g., the existing cabin speakers). Since sound takes some time to travel from its source, it may be desirable to adjust the response of the speakers on a speaker by speaker basis to ensure that the desired cancelling occurs at the appropriate locations within the cabin (e.g., where the vehicle occupants would sit). To facilitate individual adjustment of the speaker response, different filters or filter sets may be used for each speaker. Still further, the sound characteristics associated with a particular firing may be different on a cylinder bank or a per cylinder basis. As such, in some implementations it can be advantageous to provide different filters (or filter sets) for use in conjunction with different cylinder firings on an individual or per bank basis. It should be appreciated that the actual number of independently configurable filters that are appropriate for any given system will depend in significant part on the acoustic characteristic of the engine/induction/exhaust system in use and the level and sophistication of noise cancellation desired.

Filter updates are slow compared to frequencies being filtered. Engine speed can change by 1000 rpm per second.

This rapid change is similar to frequencies the ANC system is trying to eliminate. Classic filter adjustment methods will fail if applied to ANC. One solution to this problem is to provide a bank of parallel filters and smoothly switch between them as the engine operating parameters, such as firing fraction and engine speed, vary. Alternatively a more directed method of adjusting the filter coefficients, using the advanced knowledge of the firing fraction, may be employed.

One example of a bank based difference is an 8 cylinder engine having two banks of four cylinders with an asymmetric Y-pipe connecting the exhaust manifolds from the banks. The length of the exhaust paths may differ between firings in the two different banks due to the different Y-pipe segment length and it may be desirable for the active noise cancellation (ANC) controller 164 to account for these differences when determining the appropriate noise cancelling signal(s). More broadly, different exhaust manifolds/ exhaust systems often have differ exhaust path lengths on a cylinder by cylinder basis and in some instances, those differences may be significant enough for the active noise cancellation controller to differentiate the noise cancellation response based on the specific individual cylinder(s) being fired.

It should be appreciated that it is easier to cancel out lower frequency sounds. By way of example, it is typically practical to substantially cancel out sounds at frequencies below about 100 Hz using conventionally mounted speakers within the cabin. It is possible with judicious speaker placement and phase adjustment between the cabin speakers to extend the cancelling range to about 600 Hz. In this case the sounds are generally only cancelled in the location of the heads of the vehicle occupants. Sounds above that range are generally difficult to cancel in many automotive cabins. Of course these ranges are only given by way of example and the applicable ranges will vary significantly based on factors such as cabin geometry, speaker placement, the region(s) where high levels of cancellation are desired, etc.

In some embodiments, a speaker 402 is placed near or at the tailpipe 404, which is the combustion gases exhaust orifice. The tailpipe tends to be one of the largest sources of engine noise. Such co-location of the speaker with the source of the noise makes it easier to cancel the noise and expands the frequency range over which noise cancellation can be successfully employed. Another significant source of sound is the intake manifold and co-location of a speaker 402 near the intake manifold can be particularly useful for cancelling or otherwise managing intake related sounds.

It is believed that conventional automotive sound cancellation techniques use a feedback based approach to cancel out noise through the speakers. That is, the sound level is sensed and appropriate corrective feedback is applied to the speakers to cancel out the undesired sounds. In contrast, the approach described above is a feed-forward approach based on knowledge of what the engine is expected to be doing. In the primary described embodiment, knowledge of the skip fire firing sequence is used to help cancel out noises that would otherwise be generated by the engine/exhaust system/ etc. However, it should be appreciated that the same feed forward approach can be applied to mitigate other anticipated sounds is a proactive, prospective manner By way of example, other sounds that are well suited for feed forward control include air intake related sounds (which are heavily based on throttle position and engine speed), intake/exhaust valve noise and transmission noise.

The described feed-forward approach can also be combined with more traditional feedback based control to make the system adaptive and further mitigate or manage cabin noise. In such cases microphone 407 detects cabin noise which is used as an additional input by the noise cancellation controller 410. It is often useful to place the microphone 407 close to the speakers 414 to achieve a high cancellation frequency. This type of system can be used to cancel road noise, which is difficult to predict in advance.

Figure 6:
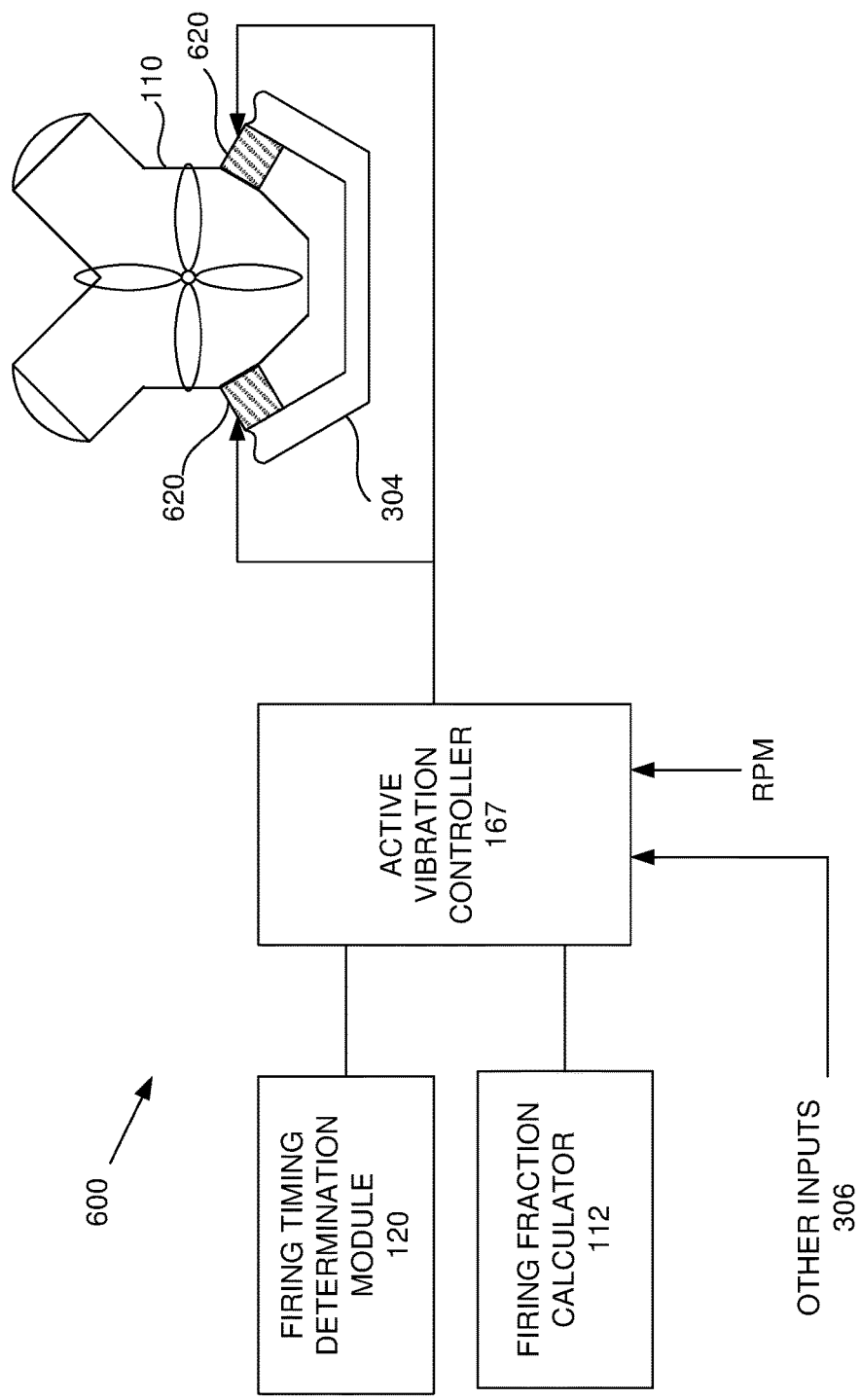
FIG. 6 is a diagram illustrating an active vibration control system according to a particular embodiment.

The vibration management approach described above with reference to FIG. 3A contemplates adjusting the stiffness/damping of active engine mounts in an effort to dampen firing pattern induced engine vibrations in an intelligent manner. In still other embodiments, active vibration control (AVC) can be accomplished in a manner that is quite analogous to active noise cancellation (ANC) by effectively adding vibration to the chassis or engine. The induced vibrations can be selected in an effort to cancel out expected vibrations (e.g., to offset or cancel out skip fire induced vibrations in the vehicle), and/or to provide a desired vibration profile (e.g., to mimic the feel expected during all cylinder operation or some other vibration profile deemed desirable in a particular application). An exemplary active vibration control embodiment 600 is described with respect to FIG. 6. In this embodiment an active vibration controller 167 is arranged to direct the operation of one or more voice coil motors or other type of electromagnetic actuator(s) or shaker(s) 620 mounted at appropriate locations on a vehicle chassis/frame 304. The specific placement of the voice coil motors will vary based on the nature and location of the vibrations sought to be damped. By way of example, in the illustrated embodiment the voice coil motors are integrated with the engine mounts and support the engine 110.

Additionally in some embodiments voice coil motors may be attached to a floor plan, or steering wheel column, and/or occupant seat. The active vibration controller 167 actuates the voice coil motors 620 at appropriate times to induce the desired vibration related effects on the vehicle.

The active vibration controller 167 receives firing fraction, firing sequence and/or engine order information from the firing fraction calculator 112, specific firing timing and/or sequence phase information from firing timing determination module 120 and the current engine speed from the ECU or other available source. Based on such firing related information and any additional desired inputs, the active vibration controller determines what vibratory inputs are desired and then directs or actuates the vibration actuators (e.g., voice coil motors 620) in the desired manner Although the described voice coil motors work well as the vibration actuators, it should be appreciate that a variety of other vibratory mechanisms can be used in place of the described voice coil motors when desired. In general, voice coil motors can be used effectively to induce vibrations at frequencies up to approximately 500 Hz, which adequately covers the range of vibrations that tend to be of most concern.

The architecture of the active vibration control system may be substantially the same as any of the active noise cancellation architectures previously described, although rather than driving speakers to induce sound cancelling signals, actuators (such as voice coil motors) are driven to induce vibration canceling signals in the engine mounts (or elsewhere). In place of any microphone used to detect acoustic signals, accelerometers or other vibration sensors can be used to detect actual vibrations in a feedback loop. The result is a feed forward system that uses skip fire firing information to reduce perceptible vibrations in a vehicle. Of course, other architectures can be used as well. When desired, feedback of the actual vibrations can be used to make the system adaptive and further refine the control. As discussed above, skip fire operation can induce a number of different periodic patterns which can potentially induce vibrations at different frequencies (and having different associated orders) and these different frequencies/orders can readily be identified and addressed at the same time using the described approach.

In most circumstances, the desired feel will be little or no perceptible engine induced vibrations. The described active vibration control can be used to help mitigate vibrations by inducing vibrations that at least partially cancel out vibrations that are expected to be induced by skip fire operation of the engine. However, in some circumstance it may be desirable to provide a particular feel. In such circumstances, the described active vibration control can be used to help define (synthesize) the overall vibration effect by controlling the vibrations associated with each cylinder firing opportunity on a firing opportunity by firing opportunity basis. The net result of this approach is a desired feel. For example, the vibration actuators can be utilized to mimic the feel of a fired cylinder during each skip so that the overall feel of the vehicle mimics the feel that would occur under all cylinder operation at any desired throttle level. Thus for example, the vehicle vibration could be controlled to be substantially the same regardless of whether the engine is operating in a skip fire mode or an all cylinder firing mode. Sound can be actively managed in much the same way as vibrations. Thus, another active sound management approach contemplates controlling the sounds associated with each cylinder firing opportunity on an individual basis such that the net result is the generation of a desired sound. This can be used to give a skip fire controlled vehicle the powerful "growl" often associated with V8 engine operation.

Such sound and vibration control can be provided throughout skip fire or other cylinder firing level modulation operation or only at designated times. For example, sound/vibration control may be desirable in response to certain detected conditions (e.g., accelerator pedal stomp or significant increases in pedal position, etc.) or only during operation in skip fire conditions that are more susceptible to generating undesirable conditions (e.g., vibrations tend to be more noticeable during skip fire operation at lower engine speeds and/or when using certain firing fractions/patterns that are inherently rougher so active vibration control may be more desirable when operating in those conditions). Using the pedal stomp example, some studies have suggested that drivers tend to associate sounds and vibrations in the 300 Hz range (e.g. 150 to 350 Hz) with a feeling of power, so sounds/vibrations in that range could be emphasized when pedal stomp is detected. Thus, it should be appreciated that in various embodiments, the sound and/or vibrations control system can readily be designed for noise/vibration cancellation, to synthesize a desired feel, or to provide a more steady state feel over varied operation.

As previously mentioned, the sounds associated with a skipped firing opportunity will be quite different than the sounds associated with a fired working cycle. These discrepancies can result in undesirable audible beats. Theoretically, such beats can be eliminated and a desired sound can be achieved by simply (a) canceling a small portion of the noise generated by each cylinder firing or introducing an appropriate interfering signal so that resultant sounds during the firing matches the desired sound; and (b) generating the appropriate incremental sounds during skipped working cycles. If both are done, the net resulting sound will match the desired sound.

Another active sound management architecture that is particularly well suited for managing engine exhaust related sounds in skip fire controlled engines will be described with respect to FIG. 7. In the illustrated embodiment active sound management system 700 is a calibrated feed forward system that utilizes a pair of adjustable FIR filters 704, 706 to drive a speaker 710 in a manner that help shapes the vehicle sound. Depending on whether a working cycle is a skip or a fire, the engine will generate a different noise. Each time a working cycle is skipped, a pulse is sent through filter 704 which causes the speaker 710 to generate a pulse filling sound. Each time a working cycle is fired, a pulse is sent through filter 706 which causes the speaker 710 to generate a sound modify the resultant firing sound in the vehicle cabin. Depending on the goals of the system, the pulse modification can be arranged to substantially cancel sounds associated with the firing, partially cancel (mitigate) the resultant sound associated with the firing, or simply modify the nature of the resulting sound. In some cases, filter 706 may block any signal to the speaker 710 so that the original engine noise is unmodified during a fire. In this case the FIR filter 704, which is active during a skip, may be configured to generate a sound substantially imitating the sound of an engine fire. This will produce a smoother output sound, which may be pleasing to the vehicle occupants. Regardless of the goals of the system, the filter used to control the sound generated by the speaker 710 changes based on whether a particular working cycle is skipped or fired. A driver 712 receives the skip/fire decisions from the firing timing determination module 120 and sends that appropriate pulse to filter 704 or 706 based on the skip/fire decision. The timing of the pulse is governed by timer generator 715. In general the timing of sound associated with an exhaust pulse is base primarily upon the timing of the exhaust valve opening. Thus, the timer generator may receive an input indicative of the cam angle and cam phaser setting to determine the timing of the valve openings. This timing information is sent to driver 712 which determines the appropriate time to send the pulses to the appropriate filters 704/706 based on the valve opening timing and any other relevant factors.

For engines operating with cylinder output level modulation, the concepts described above may be extended. For example, an engine capable of three distinct levels, zero, a low torque output, or a high torque output, will make three distinct sounds at each firing opportunity depending on the cylinder level. In this case, three different filters may be used, one for each level. An operational cylinder output level modulation mode may be characterized by a firing fraction and a level fraction. The firing fraction gives the fraction of fires to firing opportunities and the level fraction gives the fraction of high level fires to total fires.

The coefficients used in the filter are set by filter coefficient setter 720. The filter coefficient setter 720 selects the appropriate filter coefficient base on current operating conditions. These may vary based on one or more operating parameters such as engine speed. When appropriate, the coefficients can vary as a function of multiple parameters such as engine speed and air charge, etc. Thus, the filter coefficient setter 720 receives indication of the engine operating parameters needed to select or calculate the appropriate coefficients. As previously mentioned, look-up tables work well for this purpose although other data structures, can be used and/or appropriate values can be determined algorithmically if desired. When lookup tables are used, the received engine operating parameters may be used as indices for the lookup tables.

As discussed above, the sounds associated with any particular firing may vary based on the particular cylinder being fired or the bank that the cylinder resides in. Therefore, when desired, one or both the filters 704 and 706 can be implemented as a set of filters, with each filter being associated with a particular bank or cylinder. Of course, the set of filters is generally more useful in filter 706 which is associated with cylinder firings. Alternatively, if the filter is responsive enough, the filter coefficients can be changed on a working cycle by working cycle basis to accomplish the same effect.

Figure 7A:
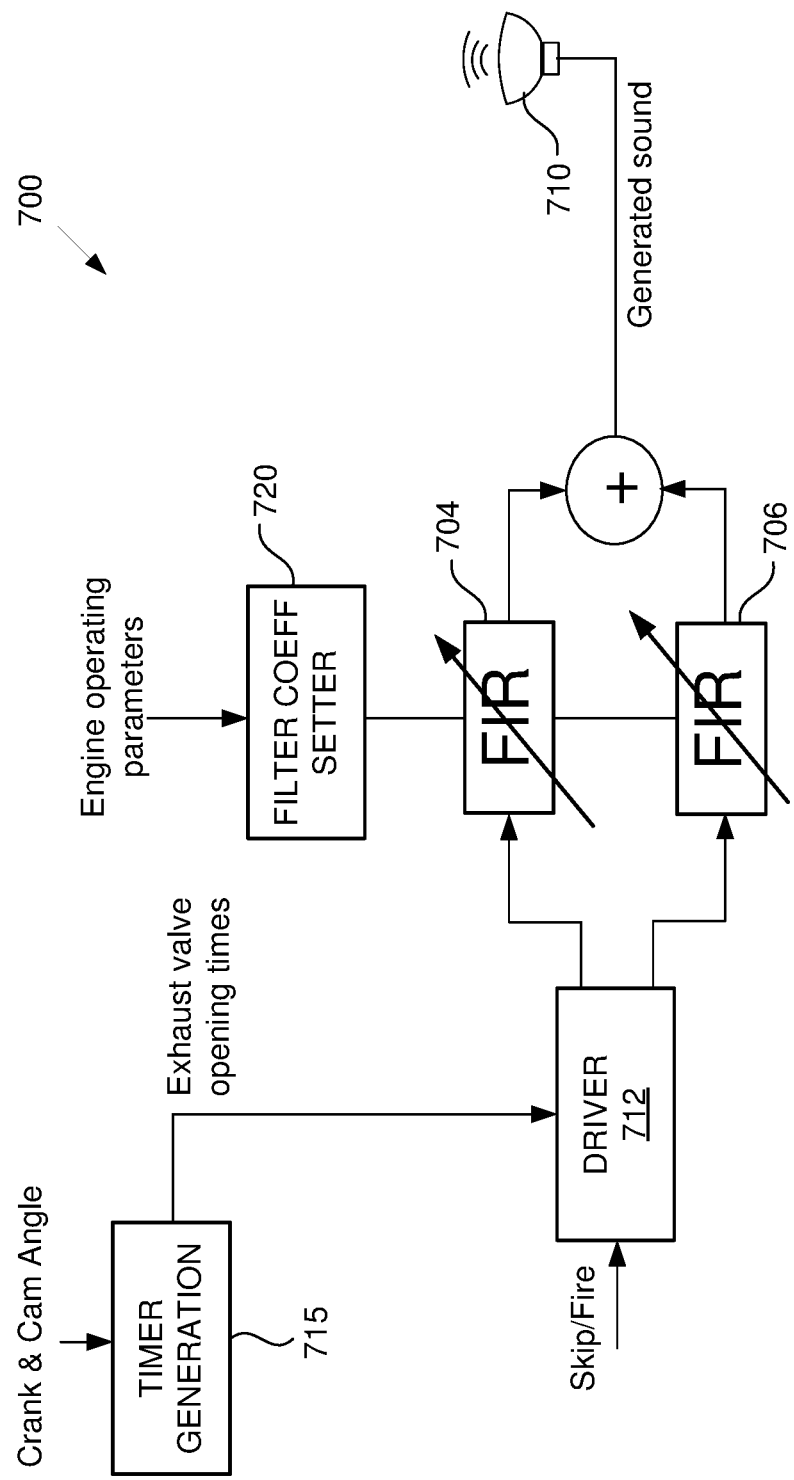
FIG. 7A is a diagram illustrating a calibrated, feed-forward acoustic management system.
Figure 7B:
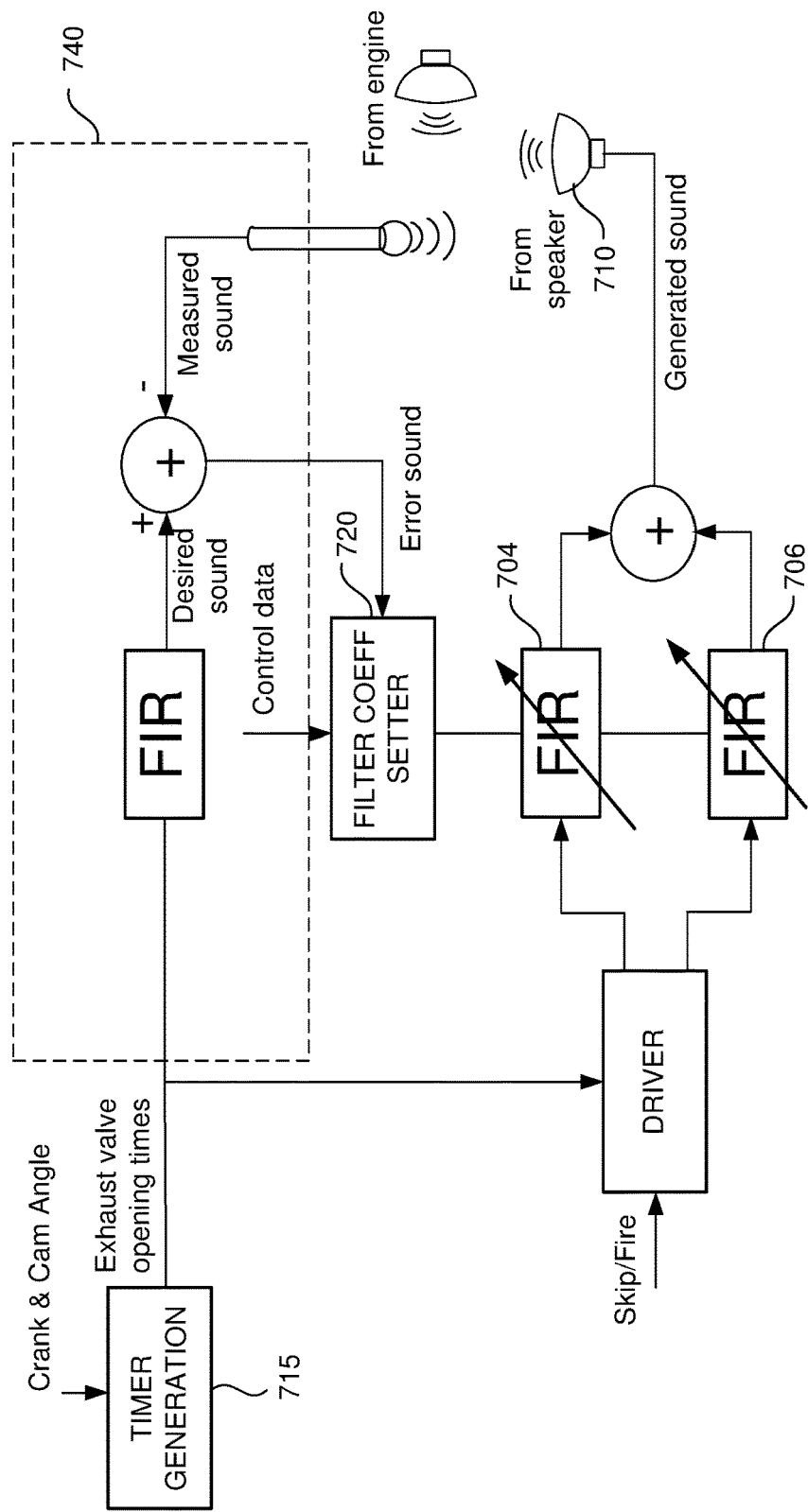
FIG. 7B is a diagram illustrating an adaptive feed-forward acoustic management system.

The active sound management system of FIG. 7A can be made adaptive by replacing filter coefficient setter 720 with an adaptive unit 740 that also receives feedback from a microphone 745 as illustrated in FIG. 7B.

To train the system, the adaptive unit 740 may be arranged to measure actual vehicle sounds in an isolated environment that is free from other types of sounds. The engine can be operated over its entire operating speed and load range. The vehicle may also be operated at all transmission gear ratios. Under each operating condition the frequency, magnitude and phase are measured at each point of interest, such as the anticipated location of the driver's ears. The adaptive unit may then forward this control data into a filter coefficient setter 720. The filter coefficient setter 720 in turn defines the appropriate set of filter coefficients which determine the magnitude and phase for each frequency component to achieve the desired sound modification at the point of interest. With this arrangement, the filter coefficients that are appropriate to deliver the desired sound are determined experimentally. This is often more accurate than an analytical approach to determine the coefficients because of the complex nature of the various transfer paths.

Although FIGS. 7A and 7B show sound management systems, it should be appreciated that substantially the same architecture can be used for active vibration control as well with the speaker simply being replaced by appropriate actuators.

In the descriptions above, both feedback and feed forward approaches to NVH management have been described. In feedback based approaches, noises and/or vibrations are detected and then measures are taken to at least partially cancel out or mitigate the detected item and/or to manage the resultant auditory or vibratory response. Feedback based systems can work well because electronic sensors and the described controllers can often detect undesirable sounds and vibrations and take appropriate corrective actions before they are perceived by vehicle passengers. They also have the advantageous characteristic that they can account for effects that cannot be effectively modeled. In feed forward systems, the system's knowledge of the expected firing sequence can be used to proactively mitigate or manage the auditory and vibratory response concurrently with the firing events that would otherwise generate an undesirable response, which can mitigate or manage auditory and vibratory effects at the time they would otherwise occur. Thus, when an expected response can be effectively modeled, as is often the case with skip fire control, feed forward approaches can provide better control. In many circumstances, it may be desirable to combine both feedback and feed forward control to manage NVH effects.

Figure 5A:
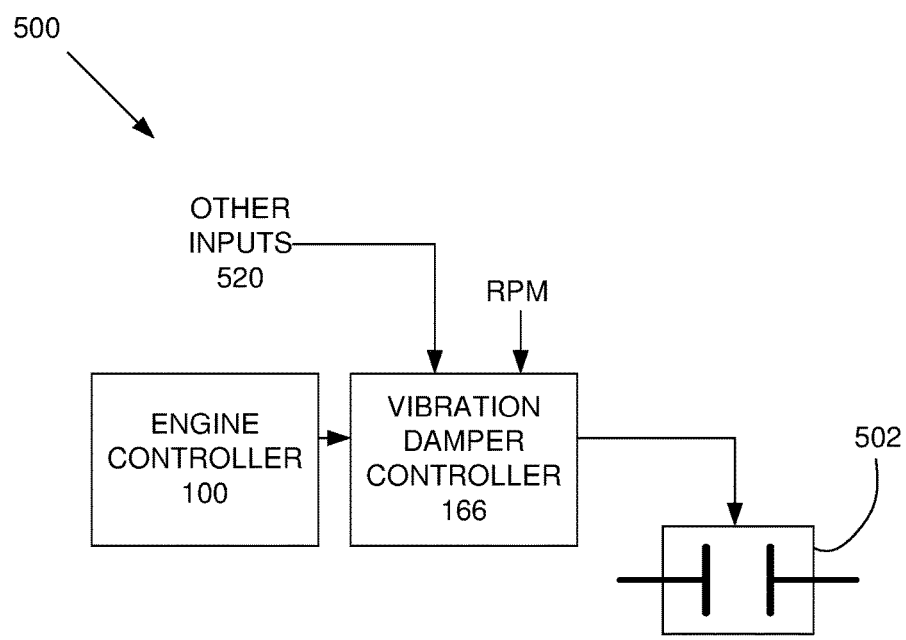
FIG. 5A is a flow diagram of a vibration damper control system according to a particular embodiment of the present invention.

Referring next to FIG. 5A, an active torsional vibration damper control system 500 according to yet another embodiment will be described. The torsional damping control system includes the engine controller 100 and the torsional vibration damper controller 166. The engine controller 100 provides firing information (e.g., a firing fraction, engine order, etc.) to the vibration damper controller 166. Based on the firing information, the vibration damper controller 166 determines a damping level that is appropriate for the commanded skip fire operating conditions and communicates with and controls a torsional vibration damper 502 to provide the desired damping. Given the nature of torsional damping, firing fraction or engine order or a related parameter is generally the most useful firing information for setting the desired damping level. However, when desired, the firing sequence, firing sequence phase and/or a firing decision for one or more working chambers can be utilized as well.

Figure 5B:
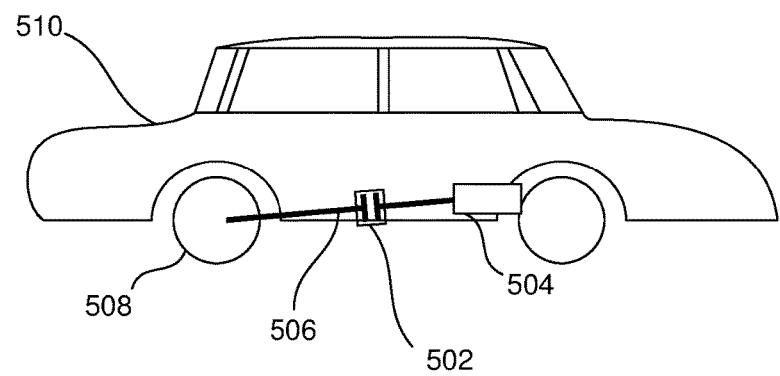
FIG. 5B is a diagram of a vibration damper incorporated into a vehicle according to a particular embodiment of the present invention.

As shown in FIG. 5B the vibration damper 502 may be situated on the drive line 506, between the transmission 504 and the drive wheels 508 of a vehicle 510. The vibration damper 502 provides a non-rigid coupling between the transmission 504 and drive wheels 508. The vibration damper may incorporate an electrorheological fluid or a magnetorheological fluid to provide a non-rigid mechanical coupling. The mechanical properties of these fluids may be altered by applying an electrical or magnetic field, respectively. Thus, the stiffness of the mechanical coupling between the transmission and drive wheels may be changed by altering the mechanical properties of these fluids. The fluid properties may be controlled to avoid or dampen torsional and bending resonances that may arise in the driveline from skip fire operation providing active torsional control. Alternatively, the vibration damper 502 may incorporate a mechanical clutch or mechanical system to vary the stiffness and/or damping of the coupling between the transmission 504 and the drive wheels 508. These types of torsional vibration dampers tend to be fairly good at damping lower frequency oscillations.

Figure 8:
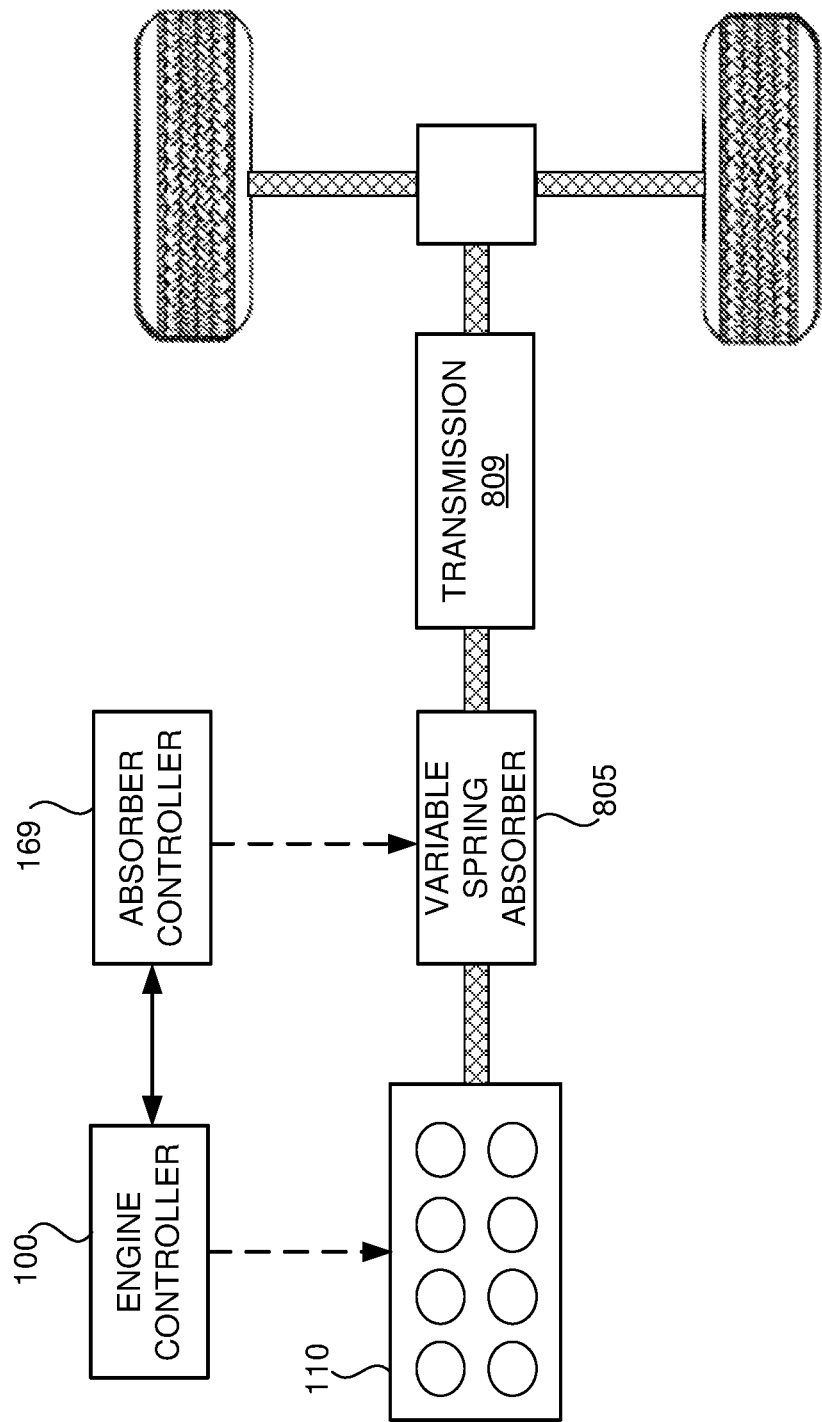
FIG. 8 is a diagram illustrating a powertrain having a variable rate absorber and an absorber controller for controlling the absorption frequency of the variable rate absorber.

Referring next to FIG. 8, yet another embodiment will be described. In this embodiment, a variable spring absorber 805 is incorporated into the powertrain between the engine 110 and the transmission 809. By way of example, suitable variable spring absorbers have been developed by BorgWarner. Variable spring absorbers are sometimes referred to as variable spring rate absorbers or simply variable absorbers. In general, a variable spring absorber is configured to efficiently transmit torque between drive train components, but to significantly dampen torsional vibrations at a designated frequency. The designated damping frequency (spring rate) may be programmatically adjusted during driving to tune the frequency of the vibrations that are being dampened at any given time. In the embodiment of FIG. 8, the noise/vibration reduction unit 102 includes an absorber controller 169 that controls the spring rate of the variable spring absorber. More specifically, the absorber controller 169 is configured to set and adjust the designated damping (absorption) frequency of the variable spring absorber during driving.

The absorption frequency (spring rate) of the variable spring absorber may be set based on a skip fire or other cylinder output level modulation characteristic. Often, the most significant vibrations in skip fire/cylinder output level modulated engines are related to the frequency at which a firing sequence repeats. Stated another way, they are a function of the minimum repeating pattern length (MRPL) and engine speed. In the context of skip fire operation with most evenly spaced firings, the minimum repeating pattern length will be the denominator of the (irreducible) firing fraction. That is a firing fraction with no common integer factor between the numerator and denominator. In some embodiments, the absorber controller 169 sets the absorption frequency of the variable spring absorber 805 to the frequency that the firing sequence repeats at the current operational conditions. For a four-stroke engine, that frequency can be determined by the formula:

$$F_{abs}=[(RPM/60)*(Cylinder\ Count/2)]\div MRPL$$

Where $F_{abs}$ is the absorption frequency, the Cylinder Count is the number of engine cylinders and MRPL is the minimum repeating pattern length.

In the context of skip fire engine operation, the minimum repeating pattern length (MRPL) is the denominator of the irreducible operational firing fraction. Therefore, it should be appreciated that in the context of skip fire engine operation, for any given engine speed, the absorption frequency $F_{abs}$ would be the same for all firing fractions having the same denominator. That is, the absorption frequency would be the same for firing fractions of ⅓ and ⅔; it would be the same for firing fractions of ⅕, ⅖, ⅗, ⅘; it would be the same for all firing fractions having a denominator of 7; etc.

In the context of multi-charge level engine operation (in which all cylinders are fired, but different cylinders may be fired at one of two different levels), the minimum repeating pattern length is determined by a ratio of high and low output firing. As previously described this ratio may be expressed as a level fraction, which is the ratio of high torque output fires to total fires. Assuming that the high and low firing are most equally spaced, the minimum repeating pattern length is the irreducible denominator of the level fraction. In the context of multi-level skip fire (in which fired cylinders may be skipped or fired at one of two levels), the minimum repeating pattern length is generally based on both the firing fraction and level fraction. The minimum repeating pattern length has a different dependence on the level fraction than on the firing fraction.

FIG. 9 shows a table 900 that illustrates some examples of different firing fraction and level fraction combinations. In table 900 the firing fraction numerator $FF_{num}$, the firing fraction denominator $FF_{den}$, the level fraction number $LF_{num}$, and the level fraction denominator $LF_{den}$ are listed in separate columns. In column 910 the greatest common factor of the firing fraction numerator and level fraction denominator ($gcf(FF_{num}, LF_{den})$) are calculated and tabulated. The minimum repeating pattern length (MRPL) is given by the product of the firing fraction denominator ($FF_{den}$) and the level fraction denominator ($LF_{den}$) divided by the term in column 910.

As an example, consider row 920 of table 900. In this case the firing fraction is ½ and the level fraction is ⅔. The values are $FF_{num}=1$, $FF_{den}=2$, $LF_{num}=2$, and $LF_{den}=3$. The greatest common factor of $FF_{num}$ and $LF_{den}$ is 1. Thus, the MRPL can be determined as 2*3/1=6. A firing pattern associated with this combination is HsHsLs,HsHsLs where H represents a high output fire, L represents a low output fire, and s represents a skip. The repeating patterns are separated by a common. Inspection of the pattern shows that the pattern repeats every 6 firing opportunities, consistent with the result in table 900.

Consider now a different case, the firing fraction and level fraction combination shown in row 930. Here the firing fraction is ⅓ and the level fraction is ½, so the firing fraction and level fraction values are switched from the previous example. The values are $FF_{num}=2$, $FF_{den}=3$, $LF_{num}=1$, and $LF_{den}=2$. The greatest common factor of $FF_{num}$ and $LF_{den}$ is 2. Thus, the MRPL can be determined as 3*2/2=3. A firing pattern associated with this combination is HLs,HLs, where a comma separates the repeating pattern. Inspection of the pattern shows that the pattern repeats every 3 firing opportunities, consistent with the result in table 900. Comparing this example with the previous example demonstrates the asymmetric nature of the firing fraction and level fraction in determination of the minimum repeating pattern length.

The other examples in table 900 show various other cases of firing fraction and level fraction combinations. In some cases, the MRPL is unaffected by switching the values of the FF and LF and in other cases switching the FF and LF values results in a change in the MRPL.

The absorber controller 169 is configured to adjust (tune) the absorption frequency in a feed forward manner based on changes in the operational engine speed and the MRPL. In embodiments that utilize dynamic skip fire or other dynamic cylinder output level modulation, the effective firing fraction and MRPL may change relatively often during many normal types of engine operation. For example, firing fraction changes often occur as frequently as every few seconds or less when a relatively large number of firing fractions are available/supported. Similarly, the engine speed can change relatively rapidly during many types of engine operation. Therefore, the absorber controller 169 may update the absorption frequency relatively rapidly. For example, the absorption frequency may be updated on the order of once a second. It should be appreciated that if the firing fraction is changing very rapidly, for example, during rapid acceleration where the firing fraction may change several times a second, it is not necessary for the absorption frequency to change as rapidly since there is no repeating pattern and thus no time for vibrations to build up in the powertrain.

The desired absorption frequency can be determined in a wide variety of different manners, including calculating the absorption frequency algorithmically based on current operating parameters, through the use of lookup tables that utilize factors such as engine speed and one of (i) firing fraction, (ii) minimum repeating pattern length, (iii) engine order, (iv) a harmonic of any of the foregoing, etc. as indices for the lookup table, or through the use of other suitable data structures.

The figures refer to subcomponents and functional blocks that perform various functions. It should be appreciated that some of these subcomponents may be combined into a larger single component, or that a feature of one subcomponent may be transferred to another subcomponent. The present invention contemplates a wide variety of control methods and mechanisms for performing the operations described herein, and is not limited to what is expressly shown in the figures. For example, in the various illustrated embodiments, the firing information provided to the various vibration and noise management controllers is typically described as coming from the firing fraction calculator 112 and/or the firing timing determination module 120. Although this architecture works well, it should be appreciated that such information can come from any suitable source. For example, in many implementations, the functionality of the firing fraction calculator and firing timing determination module will be accomplished by an engine control unit (ECU) or a powertrain controller that may not incorporate readily identifiable modules that perform the corresponding functions. In still other embodiments, the desired skip fire firing sequences may be determined in very different manners. Regardless of how the firing sequences are determined, the relevant firing related information can readily be provided to the various noise and vibration related controllers. In the illustrated embodiments, the controllers are typically shown as independent units to facilitate the ease of explanation. However, again, the functionality of such units can readily be incorporated into an ECU or powertrain controller or any other suitable control unit. Indeed, it is anticipated that in most commercial applications, the functionality of the various described vibrations controllers would be incorporated into the ECU or powertrain controller as opposed to being embodied as discrete components.

The described embodiments work well with skip fire engine operation. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions. In dynamic skip fire control, firing decisions may be made on a firing opportunity by firing opportunity basis. In some implementations, working chambers are fired under optimal or close to optimal conditions, that is the conditions that yield maximum fuel efficiency. In some embodiments, during the firing of working chambers the throttle is positioned to maintain a manifold absolute pressure greater than 70, 80, 90 or 95 kPa to minimize pumping losses. Rather than using primarily MAP control to match the engine load, a skip fire controlled engine primarily varies the firing fraction to match the load. It should be appreciated that the present invention may be applied to conventional skip fire engine control, dynamic skip fire engine control or other types of engine control, including a variable displacement control system.

The embodiments described above have primarily been described in the context of mitigating NVH concerns during skip fire control of an engine. However, it should be appreciated that the described techniques are equally applicable to multi-charge level or other types of cylinder output level modulation engine operation.

When the use of multiple non-zero firing levels is contemplated (e.g., during multi-level skip fire or multi-charge level operation of an engine), it is often efficient to consider an effective firing fraction which correlates to the percentage or fraction of the cylinders that would be fired at a high or reference output. For example, if half of the cylinders are fired at a cylinder output level of 70% of a full firing output and the other half are fired at the full firing output level, then the effective firing fraction would be 85%. In another example, if a quarter of the cylinders are fired at a cylinder output level of 70% of a full firing output, another quarter are fired at the full firing output level, and the other half are skipped, then the effective firing fraction would be 42.5%. In yet another example, if traditional skip fire operation is used (i.e., firing a designated percentage of the firing opportunities), then the effective firing fraction may represent the percentage of the cylinders that are actually fired. That is the firing fraction and effective firing fraction are equivalent in single level, skip fire operation.

Rather than being limited to making a skip/fire decision for every firing opportunity, the firing control system may choose between firings having different torque signatures (dynamic multi-charge level engine operation) or firing opportunities having more than two choices for the torque signature, e.g. skip/low/high (dynamic multi-level skip fire engine operation). When only two different firing levels are supported at any time (as is common in multi-charge level engine operation), the NVH mitigation control can be substantially the same as the control described above for skip fire engine operation. When more than two firing levels are used, the device control may be based on individual firing decisions (as discussed in the context of some of the embodiments described above) or on minimum repeating pattern length (as discussed in the context of the variable spring absorber embodiment described above) or other appropriate characteristic such as engine order or a harmonic thereof, effective firing fraction, etc.

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle—including cars, trucks, boats, construction equipment, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines, axial engines and other types of rotary engines, mixed cycle engines (such as dual Otto and diesel engines), radial engines, etc. It is also believed that the described approaches will work well with newly developed internal combustion engines regardless of whether they operate utilizing currently known, or later developed thermodynamic cycles. The described embodiments can be adjusted to work with engines having equally or unequally sized working chambers.

The described methods and arrangements may also be integrated into a hybrid powertrain where the crankshaft may be driven by a combination of an internal combustion engine and some auxiliary power source, such as an electric motor. In general, the auxiliary power source may at various times add or subtract torque from the powertrain crankshaft depending on the control settings. For example, an electric motor may at times be used as an electric generator to store energy from the powertrain in an energy storage device such as a capacitor or a battery.

Although only a few embodiments of the invention have been described in detail, it should be appreciated that the invention may be implemented in many other forms without departing from the spirit or scope of the invention. For example, some of the figures illustrate a controller for a noise/reduction device (e.g., an active mount, an ANC system, a flow regulator or flapper valve, etc.) that receives firing information from a firing fraction calculator and/or firing timing determination unit. It should be appreciated that the present invention contemplates that the controller may receive a wide variety of types of firing information from any suitable source. In some approaches, this means that the firing information is received either from a firing fraction calculator or a firing timing determination module, both and/or one or more other modules or mechanisms. The firing information may be any suitable information related to the operation of the working chambers in a skip fire manner and therefore includes, but is not limited to, a firing decision, a firing sequence, a firing fraction, a firing history for one or more working chambers, information identifying a particular working chamber and firing characteristics/operations of that working chamber, etc. Therefore, the present embodiments should be considered illustrative and not restrictive and the invention is not to be limited to the details given herein.

What is claimed is:

1. A method of mitigating vibration in a vehicle having a powertrain that includes an engine and a variable spring absorber, the engine including a plurality of working chambers, the method comprising:
operating the engine in a cylinder output level modulation mode at a first effective firing fraction, wherein operation of the engine at the first effective firing fraction causes the working chambers to be fired in a repeating firing sequence having a defined minimum repeating pattern length; and
tuning an absorption frequency of the variable spring absorber for use during operation of the engine at the first effective firing fraction based at least in part on a current engine speed and a factor indicative of the minimum repeating pattern length associated with the first effective firing fraction.

2. The method as recited in claim 1 wherein the repeating firing sequence does not cause the working chambers to be operated at the same output level each engine cycle during operation of the engine at the first effective firing fraction.

3. The method as recited in claim 1 wherein during operation of the engine at the first effective firing fraction, each engine cycle, the output level of at least one of working chambers is different than that working chamber's output level during the immediately preceding engine cycle.

4. The method as recited in claim 1 wherein the minimum repeating pattern length is not an integer factor of the number of working chambers in the engine.

5. The method as recited in claim 1 wherein:
the cylinder output level modulation mode is a skip fire operational mode; and
for each firing opportunity, an independent firing decision is made whether to skip or fire an individual associated working chamber during such firing opportunity.

6. The method as recited in claim 1 wherein:
the cylinder output level modulation mode is a firing level modulation operational mode; and
for each firing opportunity, an independent firing level decision is made that is indicative of a level at which an individual associated working chamber is to be fired during such firing opportunity.

7. The method as recited in claim 1 wherein the cylinder output level modulation mode is a multi-level skip fire operational mode.

8. The method as recited in claim 5 wherein the minimum repeating pattern length is the denominator of the first effective firing fraction and for a given engine speed, a controller is configured to tune the variable spring absorber substantially the same for two different firing fractions having the same denominator.

9. The method as recited in claim 8 wherein:
the first effective firing fraction is determined in part by a firing fraction and a level fraction, the firing fraction having a numerator and denominator and the level fraction having a numerator and denominator; and
the minimum repeating pattern length is given by a product of the firing fraction denominator and the level fraction denominator divided by the greatest common factor between the firing fraction numerator and the level fraction denominator.

10. A system for reducing at least one of noise and vibration generated by an internal combustion engine during operation of the engine, the system comprising:
a powertrain that includes the engine and a variable spring absorber;
an engine controller configured to direct operation of the engine in a cylinder output level modulation mode; and
an absorber controller arranged to set an absorption frequency for the variable spring absorber during cylinder output level modulation operation of the engine, wherein the absorption frequency is set based at least in part on a minimum repeating pattern length of a repeating firing sequence associated with an operational firing fraction and level fraction.

11. The system as recited in claim 10 wherein the absorber controller is further configured to adjust the absorption frequency based on a current operational engine speed.

12. The system as recited in claim 10 wherein the absorber controller is configured to adjust the absorption frequency when a change in the operational effective firing fraction causes the engine to utilize a new firing sequence that has a different repeating firing sequence having a different minimum repeating pattern length.

13. The system as recited in claim 10 wherein:
the cylinder output level modulation mode is a skip fire operational mode;
the minimum repeating pattern length is the denominator of the firing fraction; and
the absorber controller is configured to set the variable spring absorber substantially the same for two different firing fractions having the same denominator when the engine speed is the same.

14. The system as recited in 10 wherein the engine controller is further configured to direct operation of the engine in a skip fire operational mode, and for each firing opportunity, an independent firing decision is made whether to skip or fire an individual associated working chamber during such firing opportunity.

15. The system as recited in claim 10 wherein:
the cylinder output level modulation mode is a firing level modulation operational mode; and
for each firing opportunity, an independent firing level decision is made that is indicative of a level at which an individual associated working chamber is to be fired during such firing opportunity.

16. The system as recited in claim 10 wherein:
the operational cylinder output level modulation mode is characterized by a firing fraction and a level fraction, the firing fraction having a numerator and denominator and the level fraction having a numerator and denominator; and
the minimum repeating pattern length is given by a product of the firing fraction denominator and the level fraction denominator divided by the greatest common factor between the firing fraction numerator and the level fraction denominator.

* * * * *

UNITED STATES PATENT AND TRADEMARK OFFICE
CERTIFICATE OF CORRECTION

PATENT NO. : 10,493,836 B2
APPLICATION NO. : 15/894521
DATED : December 3, 2019
INVENTOR(S) : Serrano et al.

Page 1 of 1

It is certified that error appears in the above-identified patent and that said Letters Patent is hereby corrected as shown below:

In the Specification

1. Column 9, Line 43, insert --.-- after --manner--.

2. Column 17, Line 61, insert --.-- after --manner--.

3. Column 23, Line 48, change "$FF_{den,} = 2$" to --$FF_{den} = 2$--.

In the Claims

1. In Line 1 of Claim 14 (Column 28, Line 35) insert --claim-- after --in--.

Signed and Sealed this
Tenth Day of March, 2020

Andrei Iancu
*Director of the United States Patent and Trademark Office*